US010993261B2

(12) United States Patent
Harada et al.

(10) Patent No.: US 10,993,261 B2
(45) Date of Patent: Apr. 27, 2021

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Liu Liu, Beijing (CN); Yu Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/092,972

(22) PCT Filed: Apr. 14, 2017

(86) PCT No.: PCT/JP2017/015380
§ 371 (c)(1),
(2) Date: Oct. 11, 2018

(87) PCT Pub. No.: WO2017/179725
PCT Pub. Date: Oct. 19, 2017

(65) Prior Publication Data
US 2019/0124691 A1    Apr. 25, 2019

(30) Foreign Application Priority Data
Apr. 14, 2016    (JP) .............................. JP2016-081386

(51) Int. Cl.
*H04W 72/04*    (2009.01)
*H04W 72/12*    (2009.01)
(Continued)

(52) U.S. Cl.
CPC ....... *H04W 74/0808* (2013.01); *H04W 16/32* (2013.01); *H04W 24/10* (2013.01);
(Continued)

(58) Field of Classification Search
CPC ...... H04L 5/001; H04W 16/32; H04W 24/10; H04W 72/04; H04W 72/042;
(Continued)

(56) References Cited

U.S. PATENT DOCUMENTS 8,830,947 B2 *   9/2014   Turtinen ........... H04W 74/0816
                                                 370/329
9,967,902 B2 *   5/2018   Yin ................... H04W 74/0816
(Continued)

FOREIGN PATENT DOCUMENTS

| WO | 2016/006450 A1 | 1/2016 |
| WO | 2016/017355 A1 | 2/2016 |
| WO | 2016/038763 A1 | 3/2016 |

OTHER PUBLICATIONS

NTT DOCOMO, Inc., "Discussion on channel access framework for potential LAA UL", 3GPP TSG RAN WG1 Meeting #83, R1-157220, Nov. 15, 2015 (Year: 2015).*
(Continued)

*Primary Examiner* — Alpus Hsu
(74) *Attorney, Agent, or Firm* — Osha Bergman Watanabe & Burton LLP

(57) ABSTRACT

To perform listening for uplink transmission at an appropriate timing, on a carrier with setting of listening. A user terminal according to an aspect of the present invention has a transmission section that transmits a signal on a carrier where a listening is performed prior to uplink transmission, a reception section that receives timing information, and a control section that controls execution timing of the listening, on the basis of the timing information.

7 Claims, 13 Drawing Sheets

(51) Int. Cl.
*H04W 74/08* (2009.01)
*H04W 24/10* (2009.01)
*H04W 72/08* (2009.01)
*H04W 16/32* (2009.01)
*H04L 5/00* (2006.01)

(52) U.S. Cl.
CPC ......... *H04W 72/04* (2013.01); *H04W 72/042* (2013.01); *H04W 72/08* (2013.01); *H04W 72/12* (2013.01); *H04W 72/1205* (2013.01); *H04W 74/08* (2013.01); *H04L 5/001* (2013.01)

(58) Field of Classification Search
CPC . H04W 72/08; H04W 72/12; H04W 72/1205; H04W 74/08; H04W 74/0808
See application file for complete search history.

(56) References Cited

U.S. PATENT DOCUMENTS

| | | | | |
|---|---|---|---|---|
| 10,177,875 | B2* | 1/2019 | Dinan | H04L 1/0023 |
| 10,178,696 | B2* | 1/2019 | Cheng | H04W 16/14 |
| 10,206,223 | B2* | 2/2019 | Belghoul | H04L 1/1861 |
| 10,383,103 | B2* | 8/2019 | Park | H04W 72/14 |
| 10,498,499 | B2* | 12/2019 | Tiirola | H04L 5/0001 |
| 2016/0050667 | A1* | 2/2016 | Papasakellariou | H04L 5/0053 370/329 |
| 2017/0156075 | A1 | 6/2017 | Harada et al. | |
| 2017/0223550 | A1 | 8/2017 | Takeda et al. | |
| 2017/0230994 | A1* | 8/2017 | You | H04W 72/042 |
| 2017/0265172 | A1 | 9/2017 | Futaki | |
| 2018/0352564 | A1* | 12/2018 | Ye | H04L 5/0053 |
| 2018/0359772 | A1* | 12/2018 | Park | H04W 16/14 |
| 2019/0313450 | A1* | 10/2019 | Mukherjee | H04W 72/0453 |

OTHER PUBLICATIONS

International Search Report issued in PCT/JP2017/015380 dated Jul. 4, 2017 (2 pages).
Written Opinion of the International Searching Authority issued in PCT/JP2017/015380 dated Jul. 4, 2017 (4 pages).
3GPP TS 36300 V13.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Sep. 2015 (254 pages).
AT&T ; "Drivers, Benefits and Challenges for LTE in Unlicensed Spectrum"; 3GPP TSG-RAN Meeting #62, RP-131701; Busan, Korea; Dec. 3-6, 2013 (3 pages).
Office Action issued in corresponding Japanese Application No. 2016-081386, dated Jul. 4, 2017 (9 pages).
Final Rejection issued in corresponding Japanese Application No. 2016-081386, dated Mar. 6, 2018 (5 pages).
Extended European Search Report issued in corresponding European Application No. 17782538.7, dated Feb. 18, 2019 (9 pages).
Nokia, et al.; "Channel Access for LAA UL"; 3GPP TSG RAN WG1 Meeting #84bis, R1-162920; Busan, South Korea; Apr. 11-15, 2016 (9 pages).
Samsung; "Discussion on LBT for self-carrier scheduling"; 3GPP TSG RAN WG1 Meeting #84bis, R1-162671; Busan, Korea; Apr. 11-15, 2016 (5 pages).
Office Action in counterpart European Patent Application No. 17782538.7 dated Jun. 30, 2020 (6 pages).

* cited by examiner

USER TERMINAL AND RADIO COMMUNICATION METHOD

TECHNICAL FIELD

The present invention relates to a user terminal and a radio communication method in the next-generation mobile communication system.

BACKGROUND ART

In UMTS (Universal Mobile Telecommunications System) networks, for the purpose of higher data rates, low latency and the like, Long Term Evolution (LTE) has been specified (Non-patent Document 1). In addition, for the purpose of wider bands and higher speed than LTE (also referred to as LTE Rel. 8 or 9), LTE-A (also referred to as LTE Advanced, LTE Rel. 10, 11 or 12) has been specified, and also a successor system of LTE (also referred to as, for example, FRA (Future Radio Access), 5G (5th generation mobile communication system), LTE Rel. 13 and later) is under study.

The LTE of Rel. 8 to 12 has been specified under an assumption that an exclusive operation is performed in a frequency band (also referred to as licensed band, licensed component carrier (CC: Component Carrier) licensed to a telecommunications carrier (operator). For example, 800 MHz, 1.7 GHz, 2 GHz and the like, are used as the licensed CC.

In recent years, spread of user terminals (UE: User Equipment) with enhanced functionality such as smartphones, tablets and the like, has caused a rapid increase of user traffic. Although further addition of frequency bands is required to absorb the increasing user traffic, spectrum of licensed CC (licensed spectrum) is limited.

In Rel. 13 LTE, therefore, it is under study (non-patent document 2) to expand the frequency of an LTE system using a band of an available unlicensed spectrum (also referred to as unlicensed band, unlicensed CC. etc.) other than the licensed CC. For example, using 2.4-GHz bands and 5-GHz bands that allow use of Wi-Fi (registered trademark) or Bluetooth (registered trademark) as the unlicensed CC is under study.

Specifically, in Rel. 13 LTE, performing Carrier Aggregation (CA) of a licensed CC and an unlicensed CC is under study. Accordingly, communication using an unlicensed CC together with a licensed CC is referred to as LAA (License-Assisted Access). Note that Dual Connectivity (DC) of a licensed CC and an unlicensed CC, or Stand-Alone (SA) operation of an unlicensed CC may also be studied with regard to LAA in the future.

CITATION LIST

Non-Patent Literature

[Non-Patent Literature 1] 3GPP TS 36.300 "Evolved Universal Terrestrial Radio Access (E-UTRA) and Evolved Universal Terrestrial Radio Access Network (E-UTRAN); Overall description; Stage2"

[Non-Patent Literature 2] AT&T, "Drivers, Benefits and Challenges for LTE in Unlicensed Spectrum, "3GPP TSG RAN Meeting #62 RP-131701

SUMMARY OF INVENTION

Technical Problem

With regard to an unlicensed CC, introduction of an interference control function is under study for the purpose of coexistence with LTE, Wi-Fi, or other systems of other operators. With regard to Wi-Fi, LBT (Listen Before Talk) based on CCA (Clear Channel Assessment) is used as an interference control function in a same frequency.

Therefore, it is also conceivable, when setting an unlicensed CC in an LTE system, to apply listening (for example, LBT) as an interference control function to control a UL transmission and/or a DL transmission. It turns out that whether or not to perform transmission and/or transmission timing is changed, on the basis of the listening result performed prior to transmission. An LBT performed by a UE prior to an uplink transmission is referred to as "UL LBT".

However, a UL LBT may not be performed at an appropriate timing, depending on the configuration of the immediately preceding DL subframe, and may cause decreased system throughput, frequency use efficiency, and the like.

The present invention has been made in view of such a respect, and it is an object of the invention to provide a user terminal and a radio communication method capable of performing listening for uplink transmission at an appropriate timing, on a carrier with setting of listening.

Solution to Problem

A user terminal according to an aspect of the present invention is characterized by having a transmission section that transmits a signal on a carrier where a listening is performed prior to uplink transmission, a reception section that receives timing information, and a control section that controls execution timing of the listening, on the basis of the timing information.

Advantageous Effects of Invention

According to the present invention, it is possible to perform listening for uplink link transmission at an appropriate timing, on a carrier with setting of listening.

DESCRIPTION OF EMBODIMENTS

Figure 1:
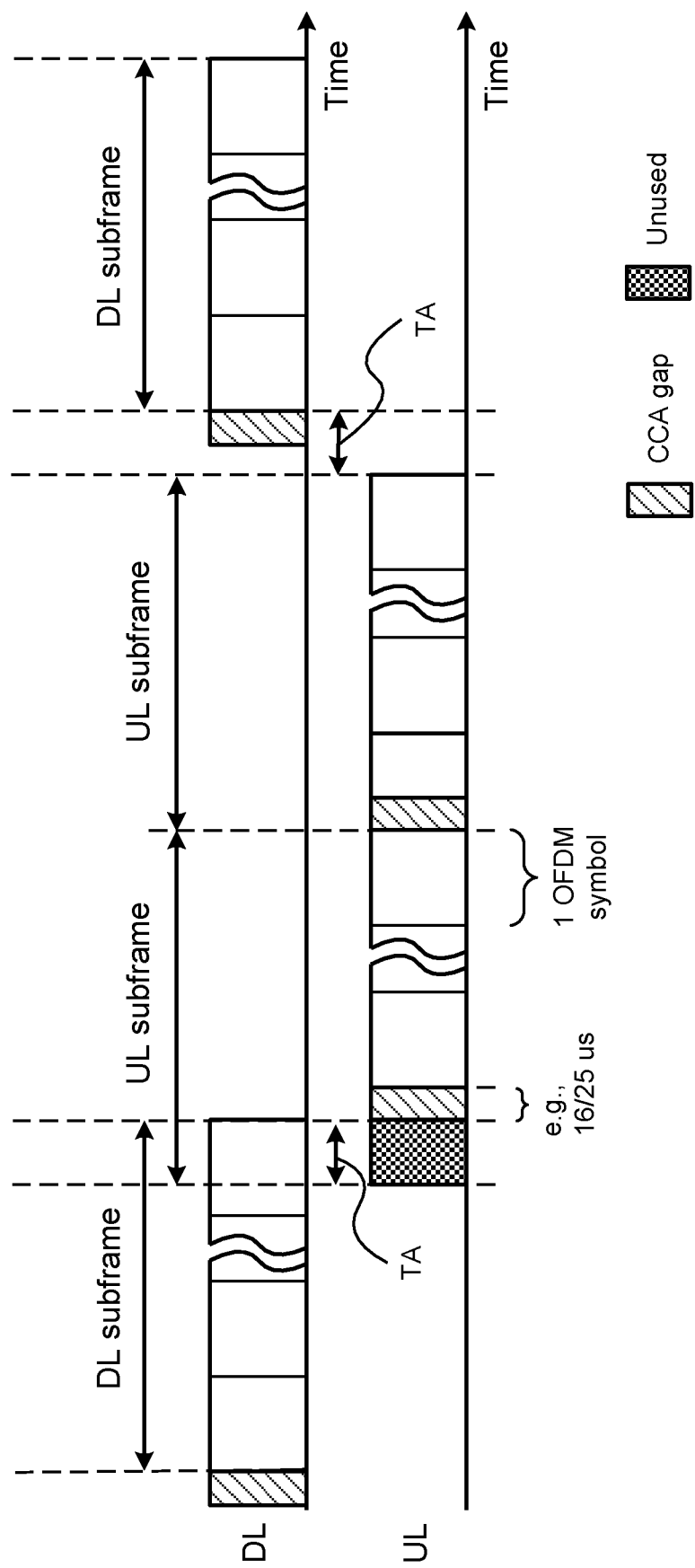
FIG. 1 shows an example of transmission/reception timing of an unlicensed CC in a case where a CCA gap is provided on the beginning of a UL subframe.

In a system (for example, an LAA system) operating LTE/LTE-A on an unlicensed CC, it is conceivable that an interference control function is required for coexistence with LTE, Wi-Fi, or other systems of other operators. Note that a system operating LTE/LTE-A on an unlicensed CC may be collectively referred to as LAA, LAA-LTE, LTE-U, U-LTE and the like, regardless of whether the operation form thereof is CA, DC, or SA.

Generally, a transmission point (for example, a radio base station (eNB: eNodeB), user terminal (UE), etc.) that performs communication using an unlicensed CC (which may also be referred to as an unlicensed cell) is prohibited to perform transmission in the CC in a case where other entities (for example, other UEs) are detected to be performing communication in a carrier using the unlicensed CC.

Accordingly, the transmission point performs listening (LBT) at a timing preceding the transmission timing by a predetermined period. Specifically, the transmission point that performs LBT searches the entire carrier band of interest (for example, one Component Carrier (CC)) at a timing preceding the transmission timing by a predetermined period (for example, an immediately preceding subframe), and recognizes whether or not other devices (for example, a radio base station, a UE, a Wi-Fi device, etc.) are performing communication in the carrier band.

Listening refers to an operation of detecting/measuring, before a certain transmission point (for example, a radio base station, a user terminal, etc.) transmits a signal, whether or not signals exceeding a predetermined level (for example, predetermined power) are being transmitted from other transmission points and the like. In addition, listening performed by a radio base station and/or a user terminal may also be referred to as channel access operation (channel access procedure), LBT, CCA (Clear Channel Assessment), carrier sense, and the like.

In addition, an LBT performed for example by an eNB prior to downlink transmission may also be referred to as a DL LBT, and an LBT performed for example by a UE prior to uplink transmission may also be referred to as a UL LBT. The UE may be notified of information relating to the carrier supposed to perform a UL LBT, determine the carrier, on the basis of the information, and perform a UL LBT.

The transmission point, upon confirming that no other device is performing communication, performs transmission using the carrier. For example, the transmission point determines that the channel is free ($LBT_{free}$) and performs transmission in a case where the received power measured by LBT (received signal power during LBT period) is equal to or lower than a predetermined threshold. The "channel free state", in other words, refers to a state that the channel is not occupied by a particular system, which may also be mentioned as the channel being idle, the channel being clear, the channel being free, and the like.

On the other hand, the transmission point, upon detecting that even a part of the carrier bands to be used for transmission is being used by other devices, terminates its own transmission processing. For example, the transmission point, upon detecting that the received power of signals from other devices relating to the band has exceeded a predetermined threshold, determines that the channel is busy ($LBT_{busy}$) and does not perform transmission. In the case of $LBT_{busy}$, the channel becomes available only after an LBT is performed again and it has been confirmed that the channel is free. Note that the method of determining the free state/busy state of the channel via LBT is not limited thereto.

In a case where the result of LBT is $LBT_{free}$, it is possible to set a period during which transmission with LBT being omitted (burst transmission) is permitted. The period may also be referred to as DL Maximum Channel Occupancy Time (MCOT), channel occupancy time, burst period (burst transmission period, burst length, maximum burst length, maximum allowable burst length), and the like. The burst period may be set to UL and DL, respectively As has been described above, it is possible to avoid interference between LAA and Wi-Fi, interference between LAA systems and the like, in a LAA system by introducing interference control based on LBT mechanism. Additionally, in a case where control of transmission points is performed independently for each operator operating an LAA system, it is also possible to reduce interference without LBT having to grasp the details of respective control.

On the other hand, in a case where LBT mechanism is introduced in an LAA system, fair coexistence with other systems (for example, Wi-Fi) or other LTE operators is required. Accordingly, it is also conceivable to apply random back off in listening when using an LTE/LTE-A system on an unlicensed CC. Random back off indicates a mechanism that, even when a channel is determined to be free as a result of listening the transmission point does not start transmission immediately but keeps transmission waiting for a randomly set period (counter value), performs listening again, and starts transmission provided that the channel is free.

With regard to UL LBT, it is under study to define category 2 in which random back off is not to be applied, and category 4 in which random back off is to be applied. In addition, the period of UL LBT is assumed to fall within a single symbol period at a maximum, taking into account influence on UL throughput.

Note that the period of a symbol may be expressed, for example, in terms of OFDM (Orthogonal Frequency Division Multiplexing)/SC-FDMA (Single Carrier Frequency Division Multiple Access), in units of the reciprocal number of a predetermined bandwidth (i.e., sampling length), or in other units.

In this case, the following two configurations are conceivable, depending on the timing of performing LBT: (1) puncture the first symbol of a UL subframe (no transmission) and perform LBT for transmission in the remaining period of the subframe; (2) puncture the last symbol of a subframe immediately preceding UL subframe and perform LBT for transmission in a UL subframe. The period of puncturing for listening may also be referred to as a CCA gap, an LBT period, and the like.

It is preferable that the CCA gap is located at the beginning of a subframe as in the above-mentioned configuration (1). This is because, in this case, the scheduler of the eNB is capable of controlling scheduling in a manner closed in the subframe performing the CCA. Although the above-mentioned configuration (2) requires determination of whether or not to perform puncture in a preceding subframe for the next subframe and therefore the degree of freedom of scheduling decreases, it is possible to fully make use of the next subframe.

FIG. 1 shows an example of transmission/reception timing of an unlicensed CC in a case where a CCA gap is provided on the beginning of the UL subframe.

The CCA gap may be 16 μs or 25 μs in the first symbol, or may be a longer period. When there is no transmission after the CCA, the channel may be taken by another system, and therefore it is conceivable to perform transmission, which may also be referred to as partial symbol transmission, during the remaining time after the CCA gap in a single symbol period, for example. The partial symbol may be used for channel estimation by transmitting a signal of a known pattern, or may be used for processing such as demodulation.

The UL transmission is shifted to be earlier than the DL subframe timing by Timing Advance (TA) specified by the eNB. TA is a process mainly intended to adjust the reception timing at the eNB side, and to secure time for switching from UL reception to DL transmission. Since an unlicensed CC requires LBT prior to DL transmission in the eNB, it is conceivable to set the amount of shift by TA to be slightly larger in order to prepare a gap period for a DL LBT after a UL reception. In FIG. 1, the second DL subframe is started after TA following its preceding UL subframe, whereby a period for performing DL LBT is secured.

Setting of TA may cause the beginning of the UL transmission to significantly overlap with the DL subframe, as shown in FIG. 1. In this case, the timing at which UL LBT may be started is not necessarily from the beginning of the UL subframe shifted to be earlier by TA, and therefore may be started at the middle of the symbol. Note that the UL subframe before starting UL LBT may be unused (no transmission).

In an existing LTE system, the TA value (amount of shift) is specified by a predetermined MAC Control Element (CE) notified in a MAC PDU (Medium Access Control Protocol Data Unit) or a PDSCH (Physical Downlink Shared Channel) to be used in an RAR. The TA value specified in the RAR is determined, on the basis of an 11-bit Timing Advance Command (TAC) field, and capable of expressing a range from 0 to about 667.7 μs.

The predetermined MAC CE described above, which is referred to as timing advance command MAC CE, indicates the difference between the current TA value and the next TA value. The MAC CE includes a 6-bit TAC field, and is capable of expressing a range from about −16.7 μs to about 16.7 μs.

Note that the granularity of the TA value is expressed in units of 16 $T_s$ (i.e., when TAC increases by 1, the TA value increases by 16 $T_s$). Here, $T_s$ expresses a basic time unit in the LTE system, with $T_s$=1/(size of subcarrier interval [Hz]* Fast Fourier transform (FFT)=1/(15000*2048)=1/30720000≈0.0326 μs. In other words, 16$T_s$ is about 0.521 μs. Note that $T_s$ may also be referred to as sampling time.

In a case of switching from DL to UL (DL-UL switching), the execution timing of the CCA varies depending on the configuration of an immediately preceding DL subframe seen from a UL subframe. The DL subframe corresponds to the last subframe in a DL burst after DL LBT and the configuration thereof may significantly vary for each burst. For example, setting the number of DL symbols in the last subframe of a DL burst to one of 14, 12, 11, 10, 9, 6 or 3 is under study.

Figure 2A:
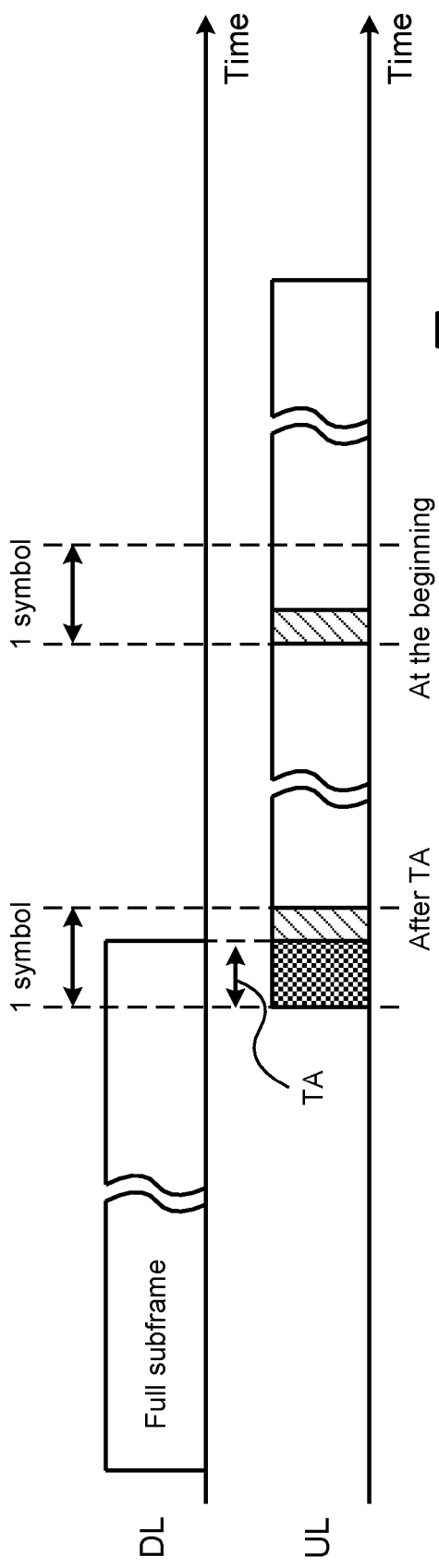
FIGS. 2A and 2B show an example of CCA timing shift depending on the number of symbols in the last subframe of a DL burst.
Figure 2B:
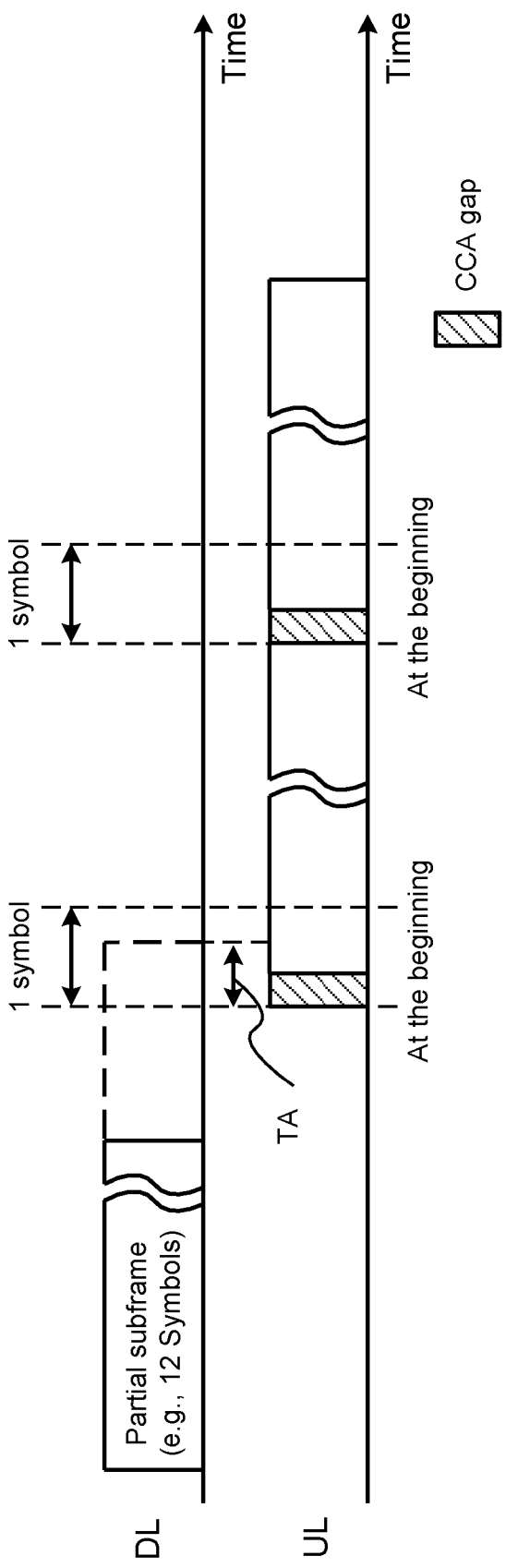

FIG. 2 contains diagrams showing an example of the CCA timing shift depending on the number of symbols in the last subframe of a DL burst. FIG. 2A shows one example in which the last subframe of the DL burst is a full subframe (for example, the number of symbols=14), and FIG. 2B shows one example in which the last subframe of the DL burst is a partial DL subframe (for example, the number of symbols=12). Note that, although a DL subframe with the number of symbols=12 is used as an exemplary partial DL subframe in the present specification, the configuration of the partial DL subframe is not limited thereto. Note that, a full subframe may also be referred to as a normal subframe.

In the example of FIG. 2A, the UE is performing DL reception at a timing shifted by TA, and therefore it turns out that the CCA is performed after completion of the full DL subframe. In the example of FIG. 2B, on the other hand, the UE has already completed the DL reception at the timing shifted by TA, and therefore may immediately perform the CCA. Additionally, in both examples, it is possible to perform the CCA at the beginning of the second UL subframe which does not overlap with the DL subframe.

However, since it is impossible to make a shift within an adjustment range of conventional TA so as to cover the decrease of the number of DL symbols in a case where the number of DL symbols in the last subframe of the DL burst is small (i.e., a partial subframe), the channel may be taken (transmitted earlier) by another device during a period from receiving a partial DL subframe to performing a CCA by the UE.

On the other hand, there arises a problem that control becomes complicated unless the timing of CCA and the candidate timing of transmission start are preliminarily determined in the UE. It is difficult for the UE to determine the position of the CCA gap in a limited time, on the basis of the type of the preceding subframe (either a complete DL subframe or a partial DL/UL subframe) and the TA. In addition, there also arises a problem of turning into $LBT_{busy}$, or the channel being taken by another device due to the DL caused by the eNB unless the timing of the CCA and the timing of stopping the DL are not in good coordination.

In addition, although it is conceivable to limit the choice of the DL last subframe to a fixed configuration so as to spare the necessity of adjusting the configuration each time by the TA, however, it is unfavorable in that the flexibility of scheduling decreases.

Therefore, the inventors have come with the idea of dynamically notifying the UE of information relating to time shift of listening, and causing the UE to identify the execution timing of a CCA. According to an aspect of the present invention, it is possible to perform the CCA at an appropriate timing in a manner following the variation in the number of DL symbols in the last subframe of the DL burst, even in a case where the period of the UL LBT is limited to one symbol per subframe at maximum.

Hereinafter, embodiments of the present invention will be described in detail, referring to the accompanying drawings. Although each embodiment will be described assuming that the UE performs the UL LBT on an unlicensed CC, the invention is not limited thereto.

For example, a configuration in which the license career (CC) is replaced by a carrier with no setting of listening (LBT) (which may also be referred to as a carrier where listening is not/cannot be performed, or a non-listening carrier, etc.), and the unlicensed carrier (CC) is replaced by a carrier with setting of listening (LBT) (which may also be referred to as a career where listening is/supposed to be performed, a listening carrier, etc.) in each embodiment is also included in the embodiments of the present invention.

(Radio Communication Method)

First Embodiment

A first embodiment of the present invention relates to a configuration which dynamically moves the beginning of a UL subframe by TA. In the first embodiment, the UE assumes that the position of CCA is always at the beginning of a subframe (symbol).

With regard to a UL subframe to be scheduled, the UE dynamically adjusts the timing of the beginning of a UL subframe, on the basis of information (which may also be referred to as TA information) related to the timing advance (TA) received from the radio base station. The TA information may be notified by the MAC CE, or notified via a Downlink Control Signal (for example, DCI: Downlink Control Information).

The TA information relates to an amount of time shift of a subframe including a listening period (CCA gap) during which listening is performed. The amount time shift may indicate the amount of shift relative to the nearest DL subframe boundary taken as the standard, for example, with regard to a predetermined UL subframe.

The temporal granularity of the TA value indicated in the TA information may be set to $16T_s$, which is similar to the temporal granularity of the TA value indicated in the conventional TAC. In this case, it is preferable to increase the number of bits of the TA information included in the MAC CE to be larger than that of an existing TAC.

In addition, the temporal granularity of the TA value indicated in the TA information may be larger than $16T_s$. For example, the temporal granularity may be the symbol length, or may be a value (for example, $64*16T_s$) resulted from multiplying $16T_s$ by a predetermined number (particularly, integer) larger than 1. Note that $64*16T_s$ corresponds to the maximum TA value (difference value) which may be expressed by an existing 6-bit TAC.

For example, letting TA be a value indicated by bits notified as TA information, the TA value in the first embodiment may be expressed as symbol_length*$T_A$, $64*16T_s*T_A$, and the like. In other words, TA information corresponds to the number of symbols used for time shift of a subframe, the numbers of periods of the value resulted from multiplying $16T_s$ by a predetermined integer larger than 1, and the like.

In addition, a plurality of temporal granularities may be defined as TA information, and pieces of information relating to respective temporal granularities may be notified in separate bits. TA value is calculated, on the basis of pieces of information relating to respective temporal granularities. For example, assuming that the TA information has pieces of information relating to two granularities, a granularity indicated by some of the bits of the TA information (information relating to a coarse temporal granularity) may be set to a value resulted from multiplying the symbol length or $16T_s$ by a predetermined integer larger than 1, and the granularity indicated by the rest of the bits (information relating to a fine temporal granularity) may be set to $16T_s$.

For example, letting $T_X$ be a value indicated by bits notified as information relating to a coarse temporal granularity, $T_Y$ a value indicated by bits notified as information relating to a fine temporal granularity, the TA value in the first embodiment may be expressed as symbol_length*$T_X$+ $16T_s*T_Y$, $64*16T_s*T_X+16T_s*T_Y$, and the like.

Note that TA information may be configured so as to include information corresponding to a smaller temporal granularity than $16T_s$.

When notifying TA information by DCI, the DCI may be a UL grant for scheduling UL transmission (for example, a DCI format 0), or DCI transmitted in a common search space (for example, a DCI format 1C, which may also be referred to as a common PDCCH), or a new DCI format may be used. Note that TA information may be expressed in place of an existing field in the DCI format, or may be indicated in a new field.

The UL grant and/or common PDCCH including TA information may be transmitted in PCell, or may be transmitted in SCell of a licensed CC and/or SCell (LAA SCell) of an unlicensed CC.

In addition, the UE may change the interpretation with regard to TA information transmitted by MAC CE on an unlicensed CC. In other words, the UE may be configured so as to determine that the TA information transmitted using MAC CE on an unlicensed CC is TA information corresponding to a larger temporal granularity than $16T_s$. In this case, the TA information is expressed by a TAC Field of the existing MAC CE.

Note that TA information may include information for identifying a temporal granularity.

Figure 3:
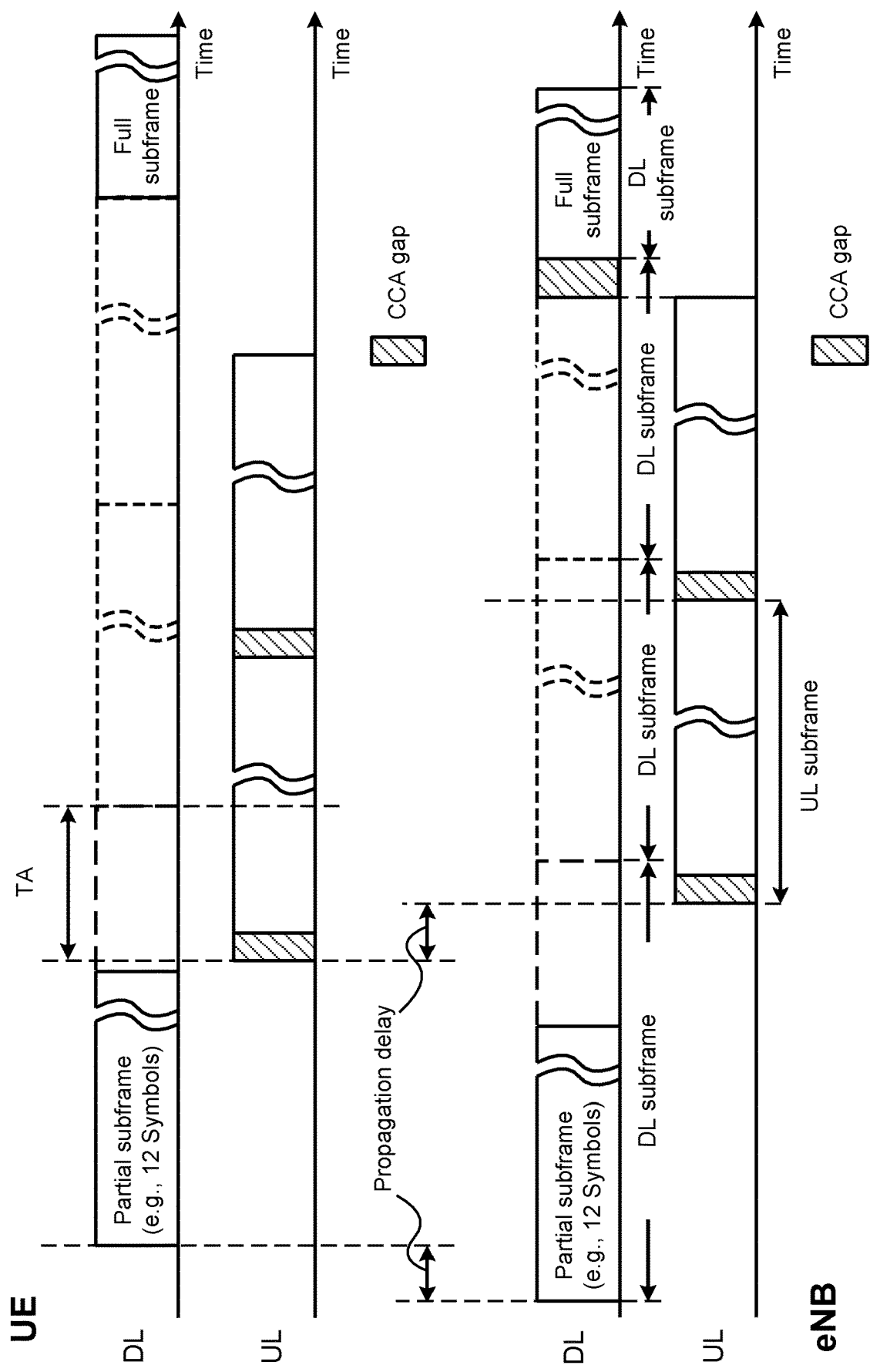
FIG. 3 shows an example of transmission/reception timing when switching from a partial DL subframe to a UL subframe in a first embodiment.

FIG. 3 shows an example of transmission/reception timing when switching from a partial DL subframe to a UL subframe in a first embodiment. FIG. 3 shows, in the upper part, a transmission/reception timing seen from by the UE side and, in the lower part, a transmission/reception timing seen from the eNB side. Taking propagation delay into consideration, the DL transmission of the eNB is shown as DL reception of the UE with a predetermined time delay. The same goes for UL. Note that FIGS. 4 to 7 described below conform to the notation in FIG. 3.

The TA information of the present embodiment allows for specifying a larger TA value than the existing TAC, and therefore the UE is capable of performing UL LBT immediately after DL reception by specifying a TA value which is slightly smaller than two symbols, as shown in FIG. 3. In this case, it is possible to suppress the risk of being interrupted by another device.

In addition, after completion of UL transmission, a large gap is formed up to the DL subframe boundary (UL-DL switch). The eNB is capable of starting DL transmission from the beginning of a subframe in a case where DL LBT has been successfully completed in the gap, whereby a high frequency use efficiency may be realized.

Figure 4:
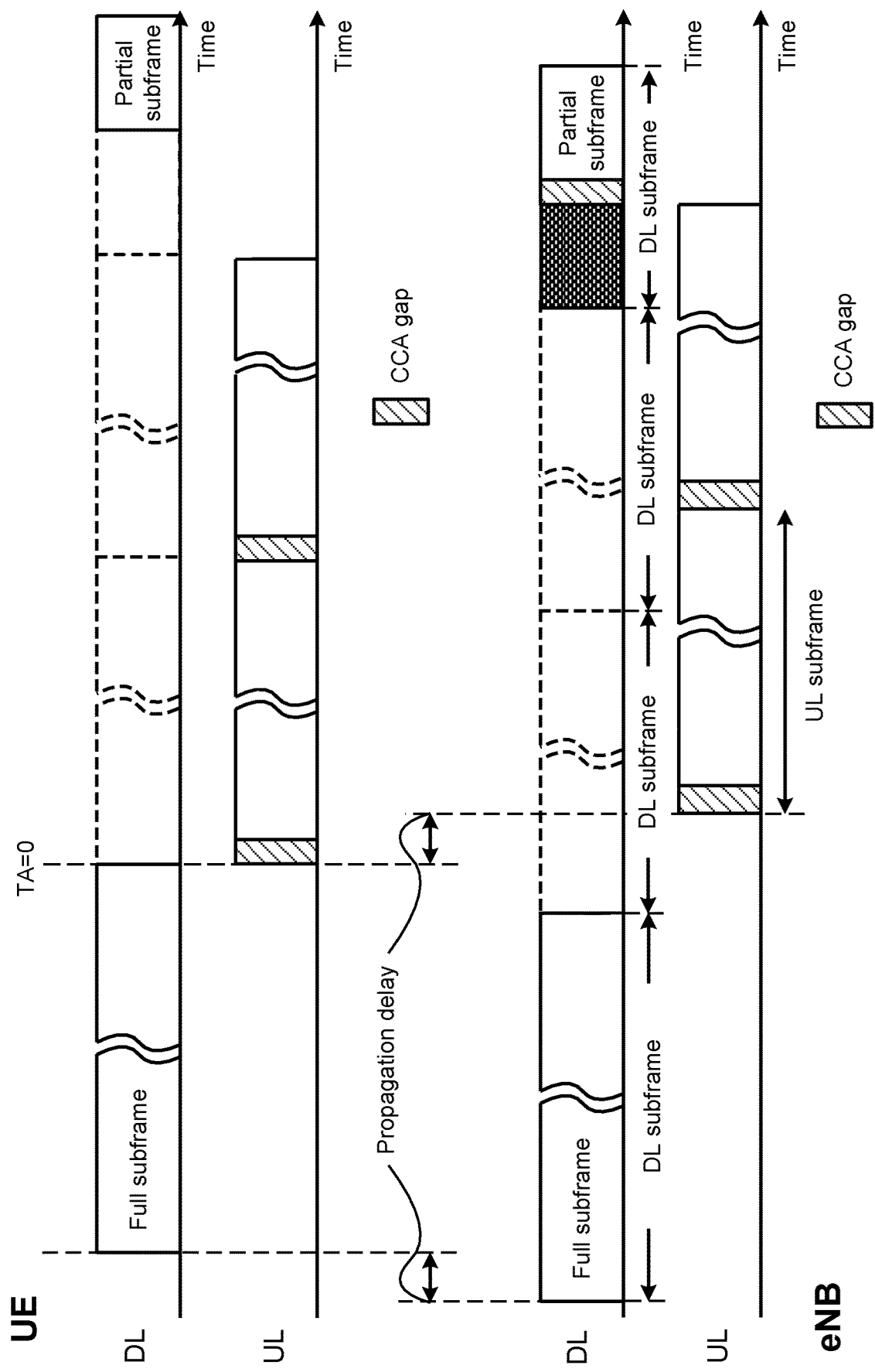
FIG. 4 shows an example of transmission/reception timing when switching from a complete DL subframe to a UL subframe in the first embodiment.

FIG. 4 shows an example of transmission/reception timing when switching from a complete DL subframe to a UL subframe in the first embodiment. In a case where the immediately preceding subframe is a complete DL subframe including 14 symbols, as shown in FIG. 4, $T_A=0$ (or $T_A$ with propagation delay) is applied.

In addition, as shown in FIG. 4, it is impossible to perform DL transmission from the subframe head (resulting in a partial subframe) in the absence of a sufficient gap up to the DL subframe boundary (UL-DL switch) after completion of UL transmission.

According to the first embodiment described above, the UE is capable of performing UL LBT immediately after DL reception at the time of DL-UL switching. In addition, it is possible to secure a CCA gap for DL LBT so that DL transmission by the eNB after UL-DL switch may be started from the beginning of the subframe.

Second Embodiment

A second embodiment of the present invention relates to a configuration in which CCA position in a UL subframe is dynamically indicated.

With regard to a UL subframe to be scheduled, the UE dynamically adjusts the execution timing of CCA, on the basis of information (which may also be referred to as CCA position information, CCA timing information, etc.) relating to the position of CCA (execution timing) received from radio base station. The CCA position information may be notified by at least one of MAC CE or DCI (UL grant, common PDCCH, new DCI format, etc.), similarly to the TA information of the first embodiment.

The CCA position information is information for shifting a CCA gap in a UL subframe. It is preferred that the CCA position information is configured so as to indicate the amount of shift in one symbol (for example, the first symbol). In this case, transmission resources of data and control signals of the second and later symbols are not affected. On the other hand, the CCA position identified by the CCA position information may be located at the second and later symbols. In this case, it is possible to increase the degree of freedom of control.

The CCA position information may be specified according to a predetermined temporal granularity. For example, the CCA position information may be expressed by a number resulting from dividing the period from the subframe head to the CCA position by a predetermined time unit (for example, $16T_s$). Note that the time unit may be set to a smaller value than $16T_s$, or may be set to a larger value than $16T_s$ (for example, the symbol length).

Additionally, information relating to CCA duration may be notified in place of, or in addition to, the CCA position information. For example, the UE may determine that the length of a CCA to be performed (CCA gap length) is 16 µs, 25 µs, or any other values, on the basis of information relating to CCA duration.

Note that the, information relating to CCA duration may be notified simultaneously with the CCA position information in a manner included in MAC CE, or may be notified at a different timing. For example, the information relating to CCA duration may be notified by upper layer signaling (for example, RRC signaling, MIB (Master Information Block), SIB (System Information Block), etc.), DCI, or a combination thereof.

In addition, notification of information relating to CCA duration and control of CCA duration based on the information, which is not limited to the second embodiment, may be applied simultaneously with the control of $T_A$ in the first embodiment.

Figure 5:
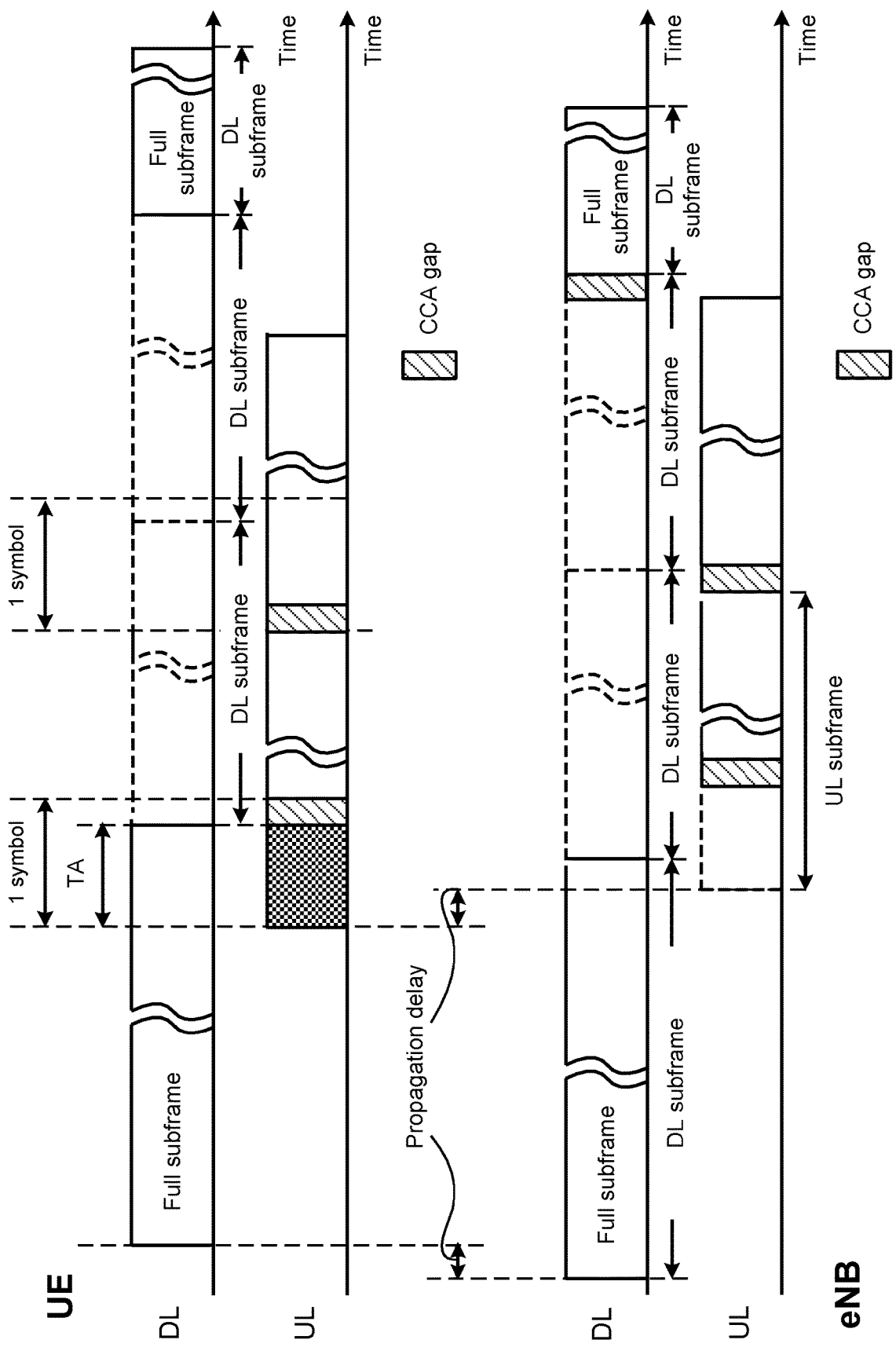
FIG. 5 shows an example of transmission/reception timing when switching from a complete DL subframe to a UL subframe in a second embodiment.

FIG. 5 shows an example of transmission/reception timing when switching from a complete DL subframe to a UL subframe in the second embodiment. In the present example, it is assumed that a relatively large TA value is specified, on the basis of the existing $T_A$ setting method.

In FIG. 5, a value corresponding for example to TA value is specified in the UE as CCA position information, in a UL grant for scheduling the UL subframe immediately after the DL subframe. In this case, the UE is capable of performing control to start CCA at a timing after a TA value from the beginning of the UL subframe shifted according to the TA value. The start timing of CCA is immediately after completion of the immediately preceding DL subframe.

Additionally, in a UL grant for scheduling the second UL subframe, a value corresponding to 0 is specified in the UE as a CCA position information. In this case, the UE is capable of performing control to start CCA from the beginning of the UL subframe.

Since a sufficient gap up to DL subframe boundary (UL-DL switching) is generated by TA after completion of UL transmission, the eNB is capable of starting DL transmission from the subframe head (transmission is allowed in a complete DL subframe) in a case where DL LBT has been successfully completed in the gap.

Figure 6:
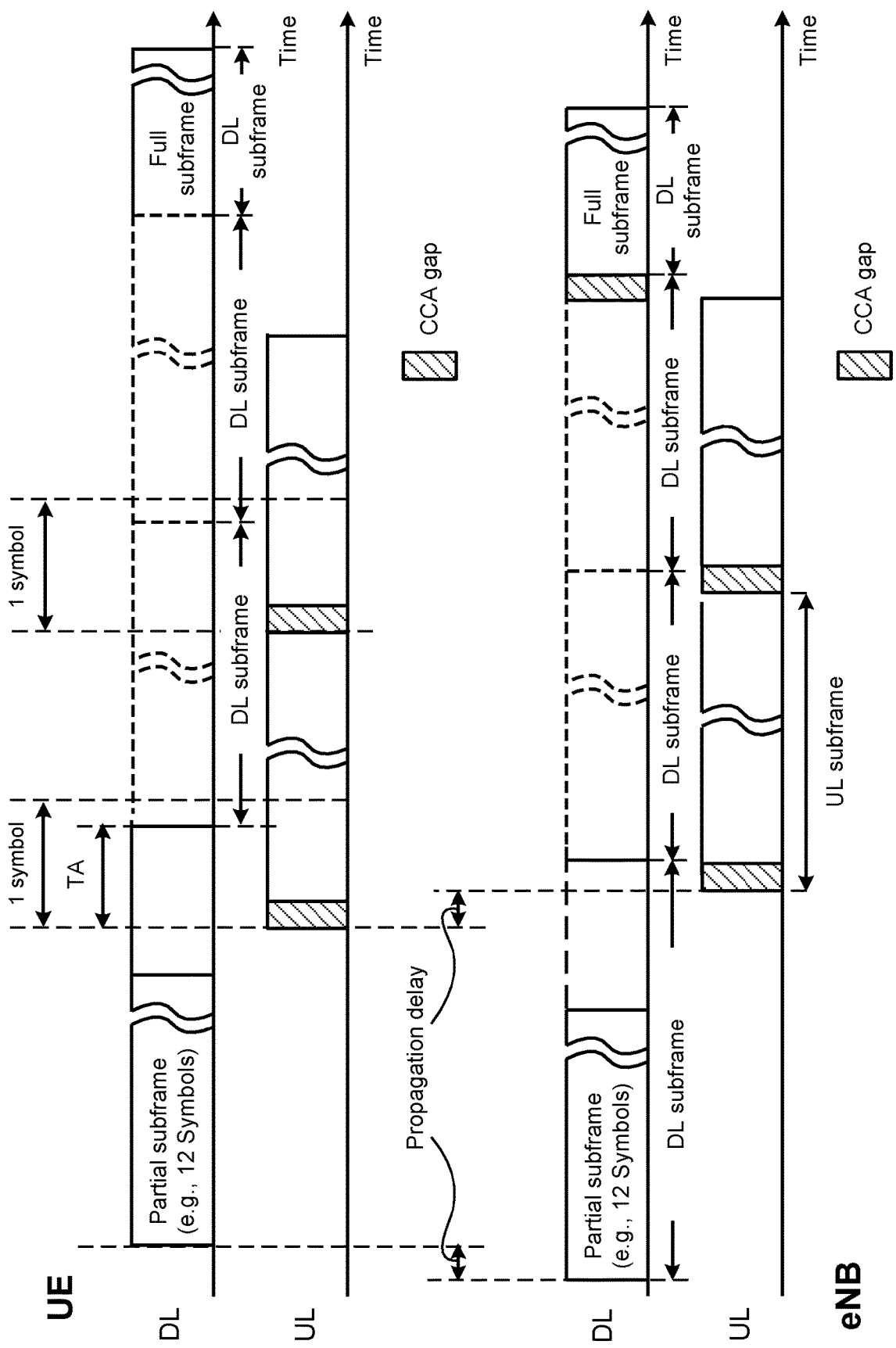
FIG. 6 shows an example of transmission/reception timing when switching from a partial DL subframe to a UL subframe in the second embodiment.

FIG. 6 shows an example of transmission/reception timing when switching from a partial DL subframe to a UL subframe in the second embodiment. The conditions are the same as those in the example of FIG. 5 except that the number of symbols of the first DL subframe is different.

In FIG. 6, a value corresponding to 0 is specified in the UE as CCA position information for both the UL grant for scheduling the UL subframe immediately after the DL subframe and the UL grant for scheduling the second UL subframe. In this case, the UE is capable of performing control to start CCA from the beginning of each UL subframe. Since a gap up to the DL subframe boundary is generated by TA after completion of UL transmission, the eNB may start DL transmission from the subframe head in a case where DL LBT has been successfully completed with the gap.

According to the second embodiment described above, the UE is capable of performing control to perform UL LBT immediately after DL reception at the time of DL-UL switching, even in a case where the value of TA is controlled quasi-statically.

Third Embodiment

A third embodiment is one that combines the first and the second embodiments together. In other words, the third embodiment uses TA information corresponding to a large value to further dynamically control the timing of the UL subframe, while allowing the CCA position to be set in a predetermined symbol.

The UE determines the CCA timing, using the TA information described in the first embodiment and the CCA position information described in the second embodiment. Here, the TA information may be used to adjust the CCA timing with a coarse granularity, and the CCA position information may be used to adjust the CCA timing with a fine granularity.

In this case, the temporal granularity of the TA value indicated in the TA information may be set to be always larger than $16T_s$. For example, the temporal granularity may be a symbol length, or may be a value resulted from multiplying $16T_s$ by a predetermined number (particularly, integer) larger than 1 (for example, $64*16T_s$). In addition, the temporal granularity of the amount of shift indicated in the CCA position information may be equal to or lower than $16T_s$.

Note that, in the third embodiment, the TA information may be notified to the UE with a longer cycle than that of the CCA position information, or may be notified at a same timing as that of the notification of the CCA position information.

Figure 7:
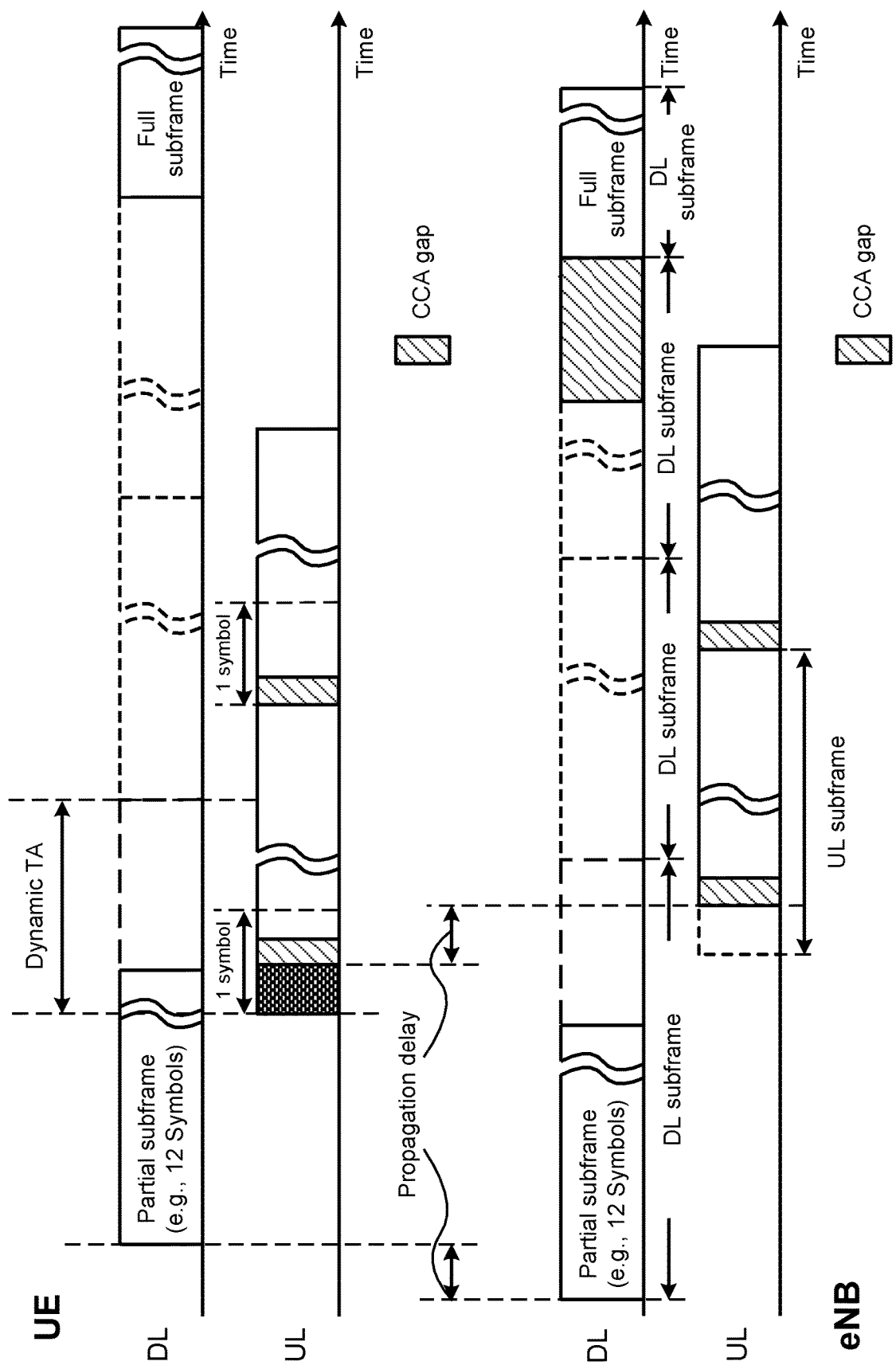
FIG. 7 shows an example of transmission/reception timing when switching from a partial DL subframe to a UL subframe in a third embodiment.

FIG. 7 shows an example of transmission/reception timing when switching from a partial DL subframe to a UL subframe in the third embodiment.

In FIG. 7, TA information indicating a larger TA value than two symbols is notified to the UE. Accordingly, the UE determines that the UL subframe starts in a manner overlapping with the partial DL subframe. The UE further determines the amount of shift of the CCA start position in the UL subframe, on the basis of the CCA position information. Accordingly, the UE is capable of performing CCA immediately after completion of the partial DL subframe.

Since there is a sufficient gap up to the DL subframe boundary (UL-DL switch) after completion of UL transmission, the eNB is capable of performing DL transmission from the subframe head, on the basis of DL LBT.

According to the third embodiment described above, it is possible to perform CCA at an appropriate timing in a manner flexibly being adapted to the DL last-subframe-configuration (symbol configuration).

Note that, although description has been provided in the above-mentioned radio communication method, assuming that $T_s=1/30720000$, the method is not limited thereto. For example, the radio communication method according to the present invention is applicable even in a case where the value of $T_s$ is larger or smaller than 1/30720000.

In addition, although description has been provided in the above-mentioned example assuming that the temporal granularity of the TA value indicated in the TA information and/or the temporal granularity of the amount of shift indicated in the CCA position information are basically larger than $16T_s$, at least one of these temporal granularities may be, more generally a temporal granularity larger than a predetermined integer times the sampling time ($T_s$). For example, the integer predetermined may be 1, 2, 4, 8, 16, 32, 64, 128, 256, 1024, and the like. In addition, the part described as being $16T_s$ in each embodiment may be replaced by a value (for example, $8T_s$, $32T_s$, $64T_s$ and the like) of predetermined integer times of sampling time ($T_s$).

In addition, although examples with variable number of symbols in the DL subframe are shown in respective embodiments, the embodiments are not limited thereto. For example, even in a case where the symbol length of each DL subframe varies, the radio communication method according to the present invention may be applied in accordance with variation of the length of the DL subframe.

(Radio Communication System)

Hereinafter, a configuration of a radio communication system according to an embodiment of the present invention will be described. In the radio communication system, a radio communication method according to one and/or a combination of the above-mentioned embodiments of the present invention will be applied.

Figure 8:
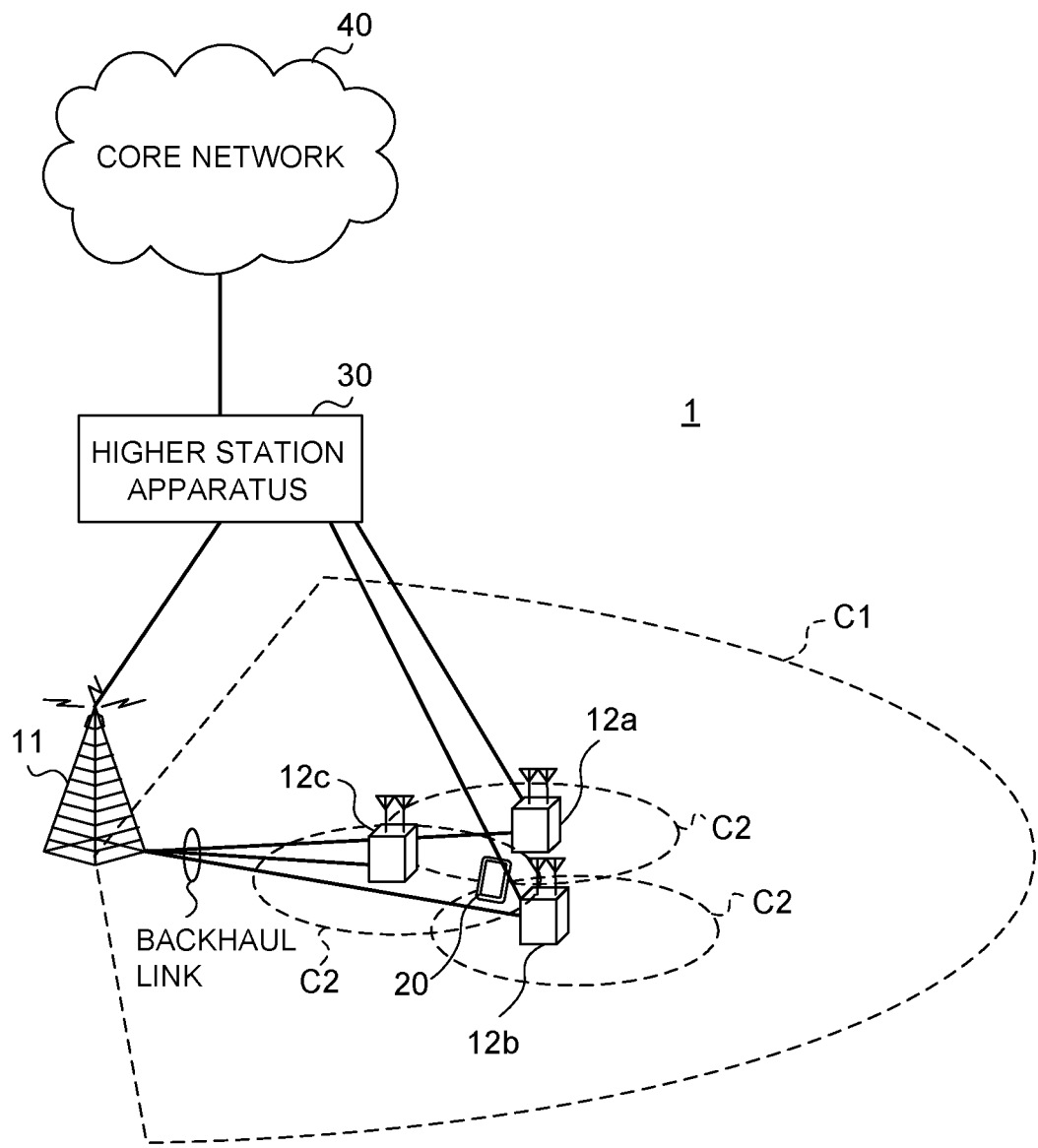
FIG. 8 shows an example of a schematic configuration of a radio communication system according to an embodiment of the present invention.

FIG. 8 shows an example of a schematic configuration of a radio communication system according to an embodiment of the present invention. In a radio communication system 1, it is possible to apply Carrier Aggregation (CA) and/or Dual Connectivity (DC) having aggregated therein a plurality of basic frequency blocks (component carriers) in units of the system bandwidth of the LTE system. In addition, the radio communication system 1 has a radio base station (for example, an LTE-U base station) for which an unlicensed CC is available.

Note that the radio communication system 1 may also be referred to as SUPER 3G, LTE-A (LTE-Advanced), IMT-Advanced, 4G (4th generation mobile communication system), 5G (5th generation mobile communication system), FRA (Future Radio Access), and the like.

The radio communication system 1 shown in FIG. 8 is provided with a radio base station 11 forming macrocell C1, and radio base stations 12 (12a to 12c) provided in the macrocell C1 and forming small cells C2 which are narrower than the macrocell C1. In addition, the macrocell C1 and respective small cells C2 have a user terminal 20 provided therein. For example, there is conceivable a form of using the macrocell C1 on a licensed CC and using the small cells C2 on an unlicensed CC (LTE-U). In addition, there is conceivable a form of using some of the small cells on a licensed CC and using other small cells on an unlicensed CC.

The user terminal 20 is connectable to both the radio base station 11 and the radio base stations 12. It is assumed that the user terminal 20 may simultaneously use, by CA or DC, the macrocell C1 and the small cells C2 which use different frequencies. For example, it is possible to transmit assist information (for example, a DL signal configuration) relating to the radio base stations 12 (for example, an LTE-U base station) using an unlicensed CC to the user terminal 20 from the radio base station 11 using a licensed CC. In addition, when performing CA on a licensed CC and an unlicensed CC, there may also be a configuration in which one radio base station (for example, the radio base station 11) controls the schedule of a licensed CC and an unlicensed CC.

Note that there may also be a configuration in which the user terminal 20 is connected to the radio base stations 12, and not connected to the radio base station 11. For example, there may also be a configuration in which the radio base stations 12 using an unlicensed CC are connected to the user terminal 20 in a standalone manner. In this case, the radio base stations 12 control the schedule of the unlicensed CC.

It is possible to perform communication between the user terminal 20 and the radio base station 11 using a carrier with a narrow bandwidth (referred to as an existing carrier, a Legacy carrier, etc.) in a relatively low frequency band (for example, 2 GHz). On the other hand, a carrier with a wide bandwidth may be used between the user terminal 20 and the radio base stations 12 in a relatively high frequency band (for example, 3.5 GHz, 5 GHz and the like), or the same carrier used for communicating with the radio base station 11 may be used. Note that the configuration of the frequency band used by each radio base station is not limited thereto.

There may be a configuration providing wired connection (for example, optical fiber, X2 interface and the like, conforming to CPRI (Common Public Radio Interface)) or wireless connection between the radio base station 11 and the radio base stations 12 (or, between two radio base stations 12).

The radio base station 11 and each of the radio base stations 12 are respectively connected to a higher station apparatus 30, and connected to the core network 40 via the higher station apparatus 30. Note that although the higher station apparatus 30 includes, for example, an access gateway apparatus, a Radio Network Controller (RNC), a Mobility Management Entity (MME) and the like, it is not limited thereto. In addition, each of the radio base stations 12 may be connected to the higher station apparatus 30 via the radio base station 11.

Note that the radio base station 11 is a radio base station having a relatively wide coverage, and may also be referred to as a macro base station, an aggregation node, an eNB (eNodeB), a transmission/reception point, and the like. In addition, the radio base stations 12 is a radio base station having a local coverage, and may also be referred to as a small base station, a micro-base station, a pico-base station, a femto-base station, an HeNB (Home eNodeB), an RRH (Remote Radio Head), a transmission/reception point, and the like. Hereinafter, when not distinguishing between the radio base stations 11 and 12, the stations are collectively referred to as radio base station 10. In addition, it is preferred that each radio base station 10 using the same unlicensed CC in a shared manner is configured so as to temporarily synchronize.

Each of the user terminal 20 is a terminal supporting various communication schemes such as LTE and LTE-A, and may include not only mobile communication terminals, but also fixed communication terminal.

As the radio access scheme in the radio communication system 1, Orthogonal Frequency Division Multiple Access (OFDMA) is applied for downlink, and Single-Carrier Frequency Division Multiple Access (SC-FDMA) is applied for uplink.

OFDMA is a multicarrier transmission scheme for dividing a frequency band into a plurality of narrow frequency bands (subcarriers), and mapping data onto each subcarrier to perform communication. SC-FDMA is a single-carrier transmission scheme for dividing a system bandwidth into bands comprised of a single or contiguous blocks for each terminal so that a plurality of terminals uses mutually different bands, and thereby reducing interference among terminals. Note that uplink and downlink radio access schemes are not limited to combinations thereof.

In the radio communication system 1, a downlink shared channel (PDSCH: Physical Downlink Shared Channel) shared between each user terminal 20, a broadcast channel (PBCH: Physical Broadcast Channel), a downlink L1/L2 control channel and the like, are used as the downlink channel. User data, upper layer control information, an SIB (System Information Block) and the like are transmitted on the PDSCH. In addition, an MIB (Master Information Block) is transmitted on the PBCH.

Downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel), and the like. Downlink Control Information (DCI) and the like, including scheduling information of the PDSCH and the PUSCH is transmitted on the PDCCH. The number of OFDM symbols to be used in the PDCCH is transmitted on the PCFICH. Receipt confirmation information (ACK/NACK) of HARQ is transmitted to the PUSCH on the PHICH. The EPDCCH is frequency-division multiplexed with the PDSCH, and used similarly to the PDCCH for transmission of DCI, and the like.

In the radio communication system 1, an uplink shared channel (PUSCH: Physical Uplink Shared Channel) shared between each user terminal 20, an uplink L1/L2 control channel (PUCCH: Physical Uplink Control Channel), a random access channel (PRACH: Physical Random Access Channel) are used as the uplink channel. The PUSCH may also be referred to as an uplink data channel. User data and an upper layers control information are transmitted on the PUSCH. In addition, downlink radio quality information (CQI: Channel Quality Indicator), receipt confirmation information (ACK/NACK) and the like are transmitted on the PUCCH. A random access preamble for establishing connection with a cell is transmitted on the PRACH.

In the radio communication system 1, a Cell-specific Reference Signal (CRS), a Channel State Information-Reference Signal (CSI-RS), a DeModulation Reference Signal (DMRS) and the like are transmitted as a downlink reference signal. Additionally, in the radio communication system 1, a Sounding Reference Signal (SRS), a Demodulation Reference Signal (DMRS) and the like are transmitted as an uplink reference signal. Note that the DMRS may also be referred to as a UE-specific Reference Signal. In addition, the reference signal to be transmitted is not limited thereto.

(Radio Base Station)

Figure 9:
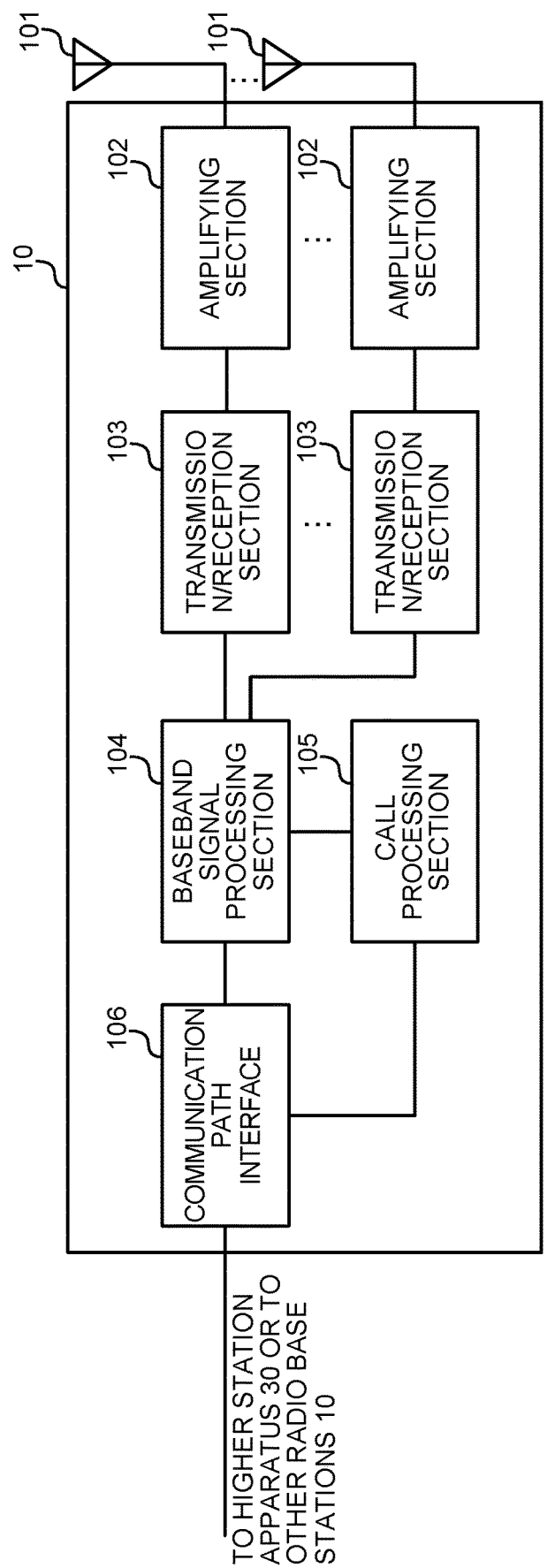
FIG. 9 shows an example of an entire configuration of a radio base station according to an embodiment of the present invention.

FIG. 9 shows an example of an entire configuration of a radio base station according to an embodiment of the present invention. The radio base station 10 is provided with a plurality of transmission/reception antennas 101, amplifying sections 102, transmission/reception sections 103, a baseband signal processing section 104, a call processing section 105, and a communication path interface 106. Note that it suffices to include, in the configuration, one or more members of the transmission/reception antennas 101, the amplifying sections 102, and the transmission/reception sections 103, respectively.

User data to be transmitted to the user terminal 20 from the radio base station 10 on downlink is input to the baseband signal processing section 104 from the higher station apparatus 30 via the communication path interface 106.

In the baseband signal processing section 104, the user data is subjected to transmission processing such as: processing of the PDCP (Packet Data Convergence Protocol) layer; segmentation and concatenation of the user data, transmission processing of RLC (Radio Link Control) layer such as RLC retransmission control; MAC (Medium Access Control) retransmission control (for example, transmission processing of a HARQ (Hybrid Automatic Repeat reQuest); scheduling, transmission format selection, channel coding, Inverse Fast Fourier Transform (IFFT) processing; and precoding processing, and transferred to the transmission/reception sections 103. In addition, downlink control signals are also subjected to transmission processing such as channel coding and Inverse Fast Fourier Transform, and transferred to transmission/reception section 103.

The transmission/reception sections 103 convert the baseband signal subjected to precoding for each antenna and output from the baseband signal processing section 104 into a radio-frequency signal, and transmit the converted signal. The radio-frequency signal which has been frequency-converted in the transmission/reception sections 103 is amplified by the amplifying sections 102 and transmitted from the transmission/reception antennas 101.

The transmission/reception sections 103 are capable of transmitting/receiving UL/DL signals on an unlicensed CC. Note that the transmission/reception sections 103 may be capable of transmitting/receiving UL/DL signals on a licensed CC. The transmission/reception sections 103 may include a transmitter/receiver, a transmission/reception circuit, or a transmission/reception apparatus, which are described on the basis of a common recognition in the technical field of the present invention. Note that the transmission/reception sections 103 may be formed as an integrated transmission/reception section, or may include a transmission section and a reception section.

On the other hand, with regard to uplink signals, radio-frequency signals received by the transmission/reception antennas 101 are amplified by the amplifying sections 102. The transmission/reception sections 103 receive uplink signals amplified by the amplifying sections 102. The transmission/reception sections 103 perform frequency conversion of the received signals into baseband signals, and output the converted signals to the baseband signal processing section 104.

In the baseband signal processing section 104, the user data included in the input baseband signal is subjected to Fast Fourier Transform (FFT) processing, Inverse Discrete Fourier Transform (IDFT) processing, error correcting decoding, reception processing of MAC retransmission control, and reception processing of RLC layer and PDCP layer, and transferred to the higher station apparatus 30 via the communication path interface 106. The call processing section 105 performs call processing such as setting and release of a communication channel, state management of the radio base station 10, and management of radio resources. The call processing section 105 performs call processing such as setting and release of a communication channel, state management of the radio base station 10, and management of radio resources.

The communication path interface 106 transmits and receives signals to and from the higher station apparatus 30 via a predetermined interface. In addition, the communication path interface 106 may transmit/receive signals (backhaul signaling) to and from another radio base station 10 via an interface between base stations (for example, optical fiber conforming to CPRI (Common Public Radio Interface), X2 interface).

Note that the transmission/reception sections 103 transmits, to the user terminal 20 on a licensed CC and/or an unlicensed CC, downlink control information (DCI) including at least one piece of information relating to time shift of listening, and/or upper layer signaling (for example, MAC CE). In addition, the transmission/reception sections 103 receives uplink signals from the user terminal 20 on an unlicensed CC on which UL LBT is being performed.

Figure 10:
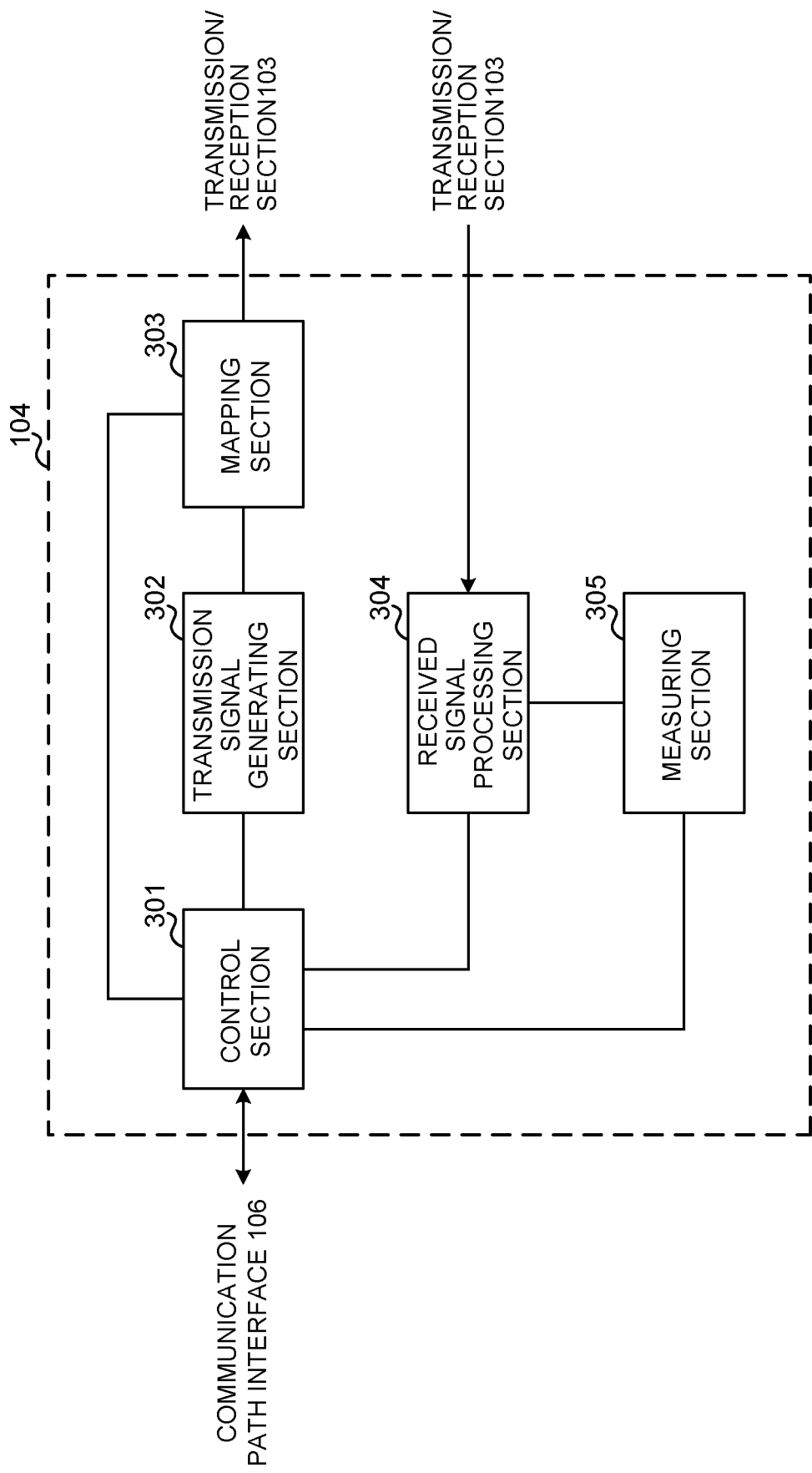
FIG. 10 shows an example of a function configuration of a radio base station according to an embodiment of the present invention.

FIG. 10 shows an example of a function configuration of a radio base station according to an embodiment of the present invention. Note that FIG. 10 mainly shows function blocks of characteristic parts in the present embodiment, and it is assumed that the radio base station 10 also has other function blocks required for radio communication.

The baseband signal processing section 104 is provided with at least a control section (scheduler) 301, a transmission signal generating section 302, a mapping section 303, a received signal processing section 304, and a measuring section 305. It suffices that the components are included in the radio base station 10, and a part or all of the components need not be included in the baseband signal processing section 104.

The control section (scheduler) 301 controls the radio base station 10 as a whole. Note that, in a case where scheduling for a licensed CC and an unlicensed CC is performed by a single control section (scheduler) 301, the control section 301 controls communication of the licensed CC and the unlicensed CC. The control section 301 may be a controller, a control circuit or a control apparatus, which are described on the basis of a common recognition in the technical field of the present invention.

The control section 301 controls, for example, generation of signals by the transmission signal generating section 302, and allocation of signals by the mapping section 303. In addition, the control section 301 controls reception processing of signals by the received signal processing section 304 and measurement of signals by the measuring section 305.

The control section 301 controls scheduling (for example, resource allocation) of system information, a downlink data signal to be transmitted on the PDSCH, and a downlink control signal to be transmitted on the PDCCH and/or the EPDCCH. In addition, the control section 301 controls scheduling of a synchronization signal (PSS (Primary Synchronization Signal)/SSS (Secondary Synchronization Signal), and a downlink reference signal such as CRS, CSI-RS and DMRS.

In addition, the control section 301 controls scheduling of an uplink data signal to be transmitted on the PUSCH, an uplink control signal (for example, a receipt confirmation signal (HARQ-ACK)) to be transmitted on the PUCCH and/or the PUSCH, a random access preamble, an uplink reference signal and the like to be transmitted on the PRACH.

In accordance with the LBT result acquired by the measuring section 305, the control section 301 may control, for the transmission signal generating section 302 and the mapping section 303, transmission of downlink signals (for example, PDCCH/EPDCCH) on a carrier (for example, unlicensed CC) in which listening is performed prior to downlink transmission.

In addition, the control section 301 performs control to generate, in the user terminal 20, at least one piece of information (which may also be referred to as time shift information) relating to time shift of listening, which is used to control time shift of a UL subframe including a listening period (for example, a CCA gap) during which listening (UL LBT) is performed and/or time shift of a listening period in the UL subframe.

The transmission signal generating section 302 generates a downlink signal (downlink control signal, downlink data signal, downlink reference signal, etc.), on the basis of an instruction from the control section 301, and outputs the generated signal to the mapping section 303. The transmission signal generating section 302 may include a signal generator, a signal generating circuit, or a signal generating apparatus, which are described on the basis of a common recognition in the technical field of the present invention.

The transmission signal generating section 302 generates, on the basis of an instruction from the control section 301, for example, a DL assignment (DL grant) for notifying allocation information of downlink signals and a UL grant for notifying allocation information of a uplink signal. In addition, downlink data signals are subjected to coding processing and modulation processing in accordance with the coding rate, modulation scheme and the like, which have been determined on the basis of Channel State Information (CSI) and the like from each of the user terminals 20.

The mapping section 303 performs mapping of the downlink signal generated in the transmission signal generating section 302 onto a predetermined radio resource, on the basis of an instruction from the control section 301, and outputs the mapped signal to the transmission/reception section 103. The mapping section 303 may include a mapper, a mapping circuit or a mapping apparatus, which are described on the basis of a common recognition in the technical field of the present invention.

The received signal processing section 304 performs reception processing (for example, demapping, demodulation, decoding, etc.) on the received signal which has been input from the transmission/reception sections 103. Here, the received signal is, for example, an uplink signal (an uplink control signal, an uplink data signal, an uplink reference signal, etc.) transmitted from the user terminal 20. The received signal processing section 304 may include a signal processor, a signal processing circuit, or a signal processing apparatus, which are described on the basis of a common recognition in the technical field of the present invention.

The received signal processing section 304 outputs the information decoded by reception processing to the control section 301. For example, when a PUCCH including a HARQ-ACK has been received, the HARQ-ACK is output to the control section 301. In addition, the received signal processing section 304 outputs the received signals, or signals subjected to reception processing, to the measuring section 305.

The measuring section 305 performs measurement relating to received signals. The measuring section 305 may include a measuring instrument, a measuring circuit, or a measuring apparatus, which are described on the basis of a common recognition in the technical field of the present invention.

The measuring section 305 may perform LBT on a carrier with setting of LBT (for example, an unlicensed CC), on the basis of an instruction from the control section 301, and output the LBT result (for example, the result of determination of whether a channel state is free or busy) to the control section 301.

In addition, the measuring section 305 may measure, for example, received power of a received signal (for example, RSRP (Reference Signal Received Power)), received signal strength (for example, RSSI (Received Signal Strength Indicator)), reception quality (for example, RSRQ (Reference Signal Received Quality)), channel state and the like. The result of measurement may be output to the control section 301.

(User Terminal)

Figure 11:
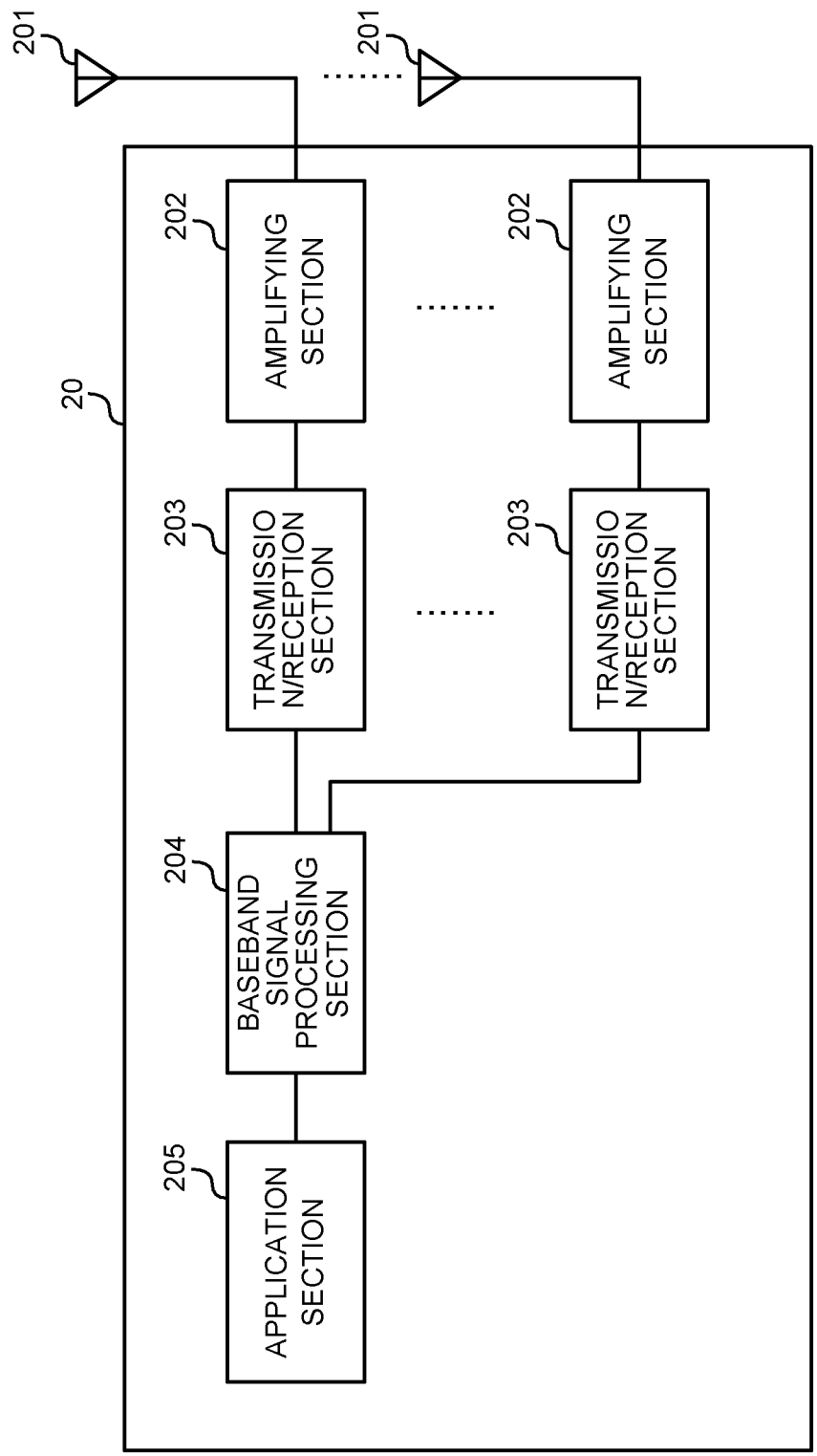
FIG. 11 shows an example of an entire configuration of a user terminal according to an embodiment of the present invention.

FIG. 11 shows an example of an entire configuration of a user terminal according to an embodiment of the present invention. The user terminal 20 is provided with a plurality of transmission/reception antennas 201, amplifying sections 202, transmission/reception sections 203, a baseband signal processing section 204, and an application section 205. Note that it suffices to include, in the configuration, one or more members of the transmission/reception antennas 201, the amplifying sections 202, and the transmission/reception sections 203, respectively.

Radio-frequency signals received by the transmission/reception antennas 201 are amplified by the amplifying sections 202. The transmission/reception section 203 receives downlink signals amplified by the amplifying sections 202. The transmission/reception sections 203 perform frequency conversion of the received signal into baseband signals, and output the converted signals to the baseband signal processing section 204. The transmission/reception sections 203 is capable of transmitting/receiving UL/DL signals on an unlicensed CC. Note that the transmission/reception sections 203 may be capable of transmitting/receiving UL/DL signals on a licensed CC.

The transmission/reception section 203 may include a transmitter/receiver, a transmission/reception circuit, or a transmission/reception apparatus, which are described on the basis of a common recognition in the technical field of the present invention. Note that the transmission/reception sections 203 may be formed as an integrated transmission/reception section, or may include a transmission section and a reception section.

The baseband signal processing section 204 performs FFT processing, error correction decoding, reception processing of retransmission control on the input baseband signals. Downlink user data is transferred to the application section 205. The application section 205 performs processing relating to a higher layer than the physical layer and the MAC layer. In addition, broadcast information, among the downlink data, is also transferred to the application section 205.

On the other hand, uplink link user data is input to the baseband signal processing section 204 from the application section 205. The baseband signal processing section 204 performs transmission processing of retransmission control (for example, transmission processing of HARQ), channel coding, precoding, Discrete Fourier Transform (DFT) processing, IFFT processing and the like, and transfers the processed data to the transmission/reception sections 203. The transmission/reception section 203 converts the baseband signal output from the baseband signal processing section 204 into a radio-frequency signal, and transmits the converted signal. The radio-frequency signal which has been frequency-converted in the transmission/reception sections 203 is amplified by the amplifying sections 202 and transmitted from the transmission/reception antennas 201.

Note that the transmission/reception sections 203 receives, from the radio base station 10 on a licensed CC and/or an unlicensed CC, downlink control information (DCI) including at least one piece of information relating to time shift of listening and/or upper layer signaling (for example, MAC CE). The DCI may be downlink control information (UL grant) for scheduling transmission of a UL subframe, or downlink control information transmitted in a common search space (common PDCCH). In addition, the transmission/reception sections 203 transmits uplink signals to the radio base station 10 on an unlicensed CC on which UL LBT is being performed.

Figure 12:
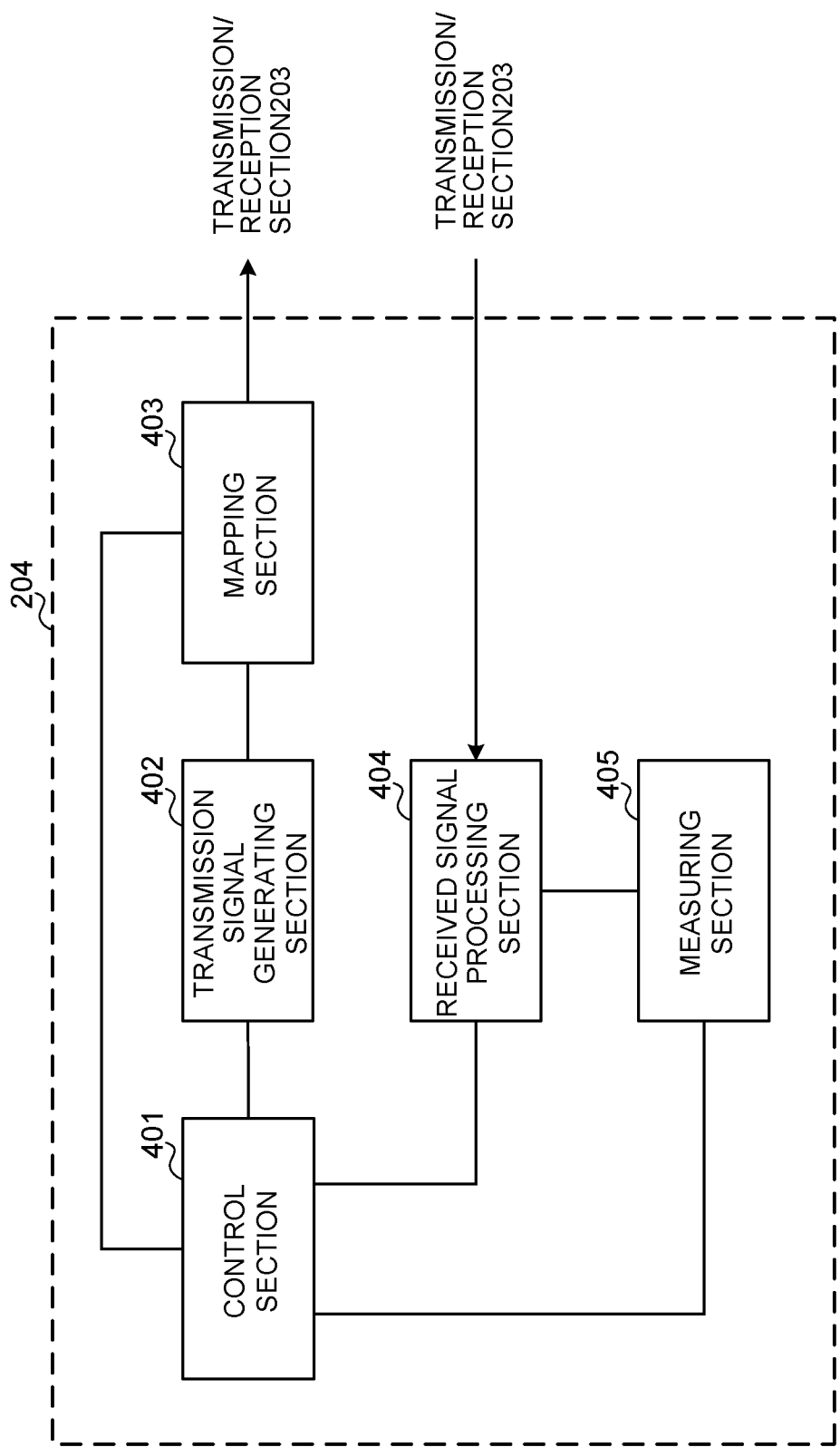
FIG. 12 shows an example of a function configuration of a user terminal according to an embodiment of the present invention.

FIG. 12 shows an example of a function configuration of a user terminal according to an embodiment of the present invention. Note that FIG. 12 mainly shows function blocks of characteristic parts in the present embodiment, and it is assumed that the user terminal 20 has other function blocks required for radio communication.

The baseband signal processing section 204 included in the user terminal 20 is provided with at least a control section 401, a transmission signal generating section 402, a mapping section 403, a received signal processing section 404, and a measuring section 405. It suffices that the components are included in the user terminal 20, and a part or all of the components need not be included in the baseband signal processing section 204.

The control section 401 controls the user terminal 20 as a whole. The control section 401 may include a controller, a control circuit, or a control apparatus, which are described on the basis of a common recognition in the technical field of the present invention.

The control section 401 controls, for example generation of signals by the transmission signal generating section 402, and allocation of signals by the mapping section 403. In addition, the control section 401 controls reception processing of signals by the received signal processing section 404 and measurement of signals by the measuring section 405.

The control section 401 acquires, from the received signal processing section 404, a downlink control signal (a signal transmitted on the PDCCH/EPDCCH) and a downlink data signal (a signal transmitted on the PDSCH) transmitted from the radio base station 10. The control section 401 controls generation of an uplink control signal (for example, a receipt confirmation signal (HARQ-ACK)) and an uplink data signal, on the basis of the result of determining the necessity of retransmission control on the downlink control signal and the downlink data signal.

The control section 401 may control transmission of uplink signals (for example, PUCCH and PUSCH) to the transmission signal generating section 402 and the mapping section 403 on the carrier (LBT carrier) that performs listening (UL LBT) prior to uplink transmission, in accordance with the LBT result acquired by the measuring section 405.

The control section 401 controls time shift of a UL subframe including a listening period (for example, a CCA gap) during which listening (UL LBT) is performed and/or time shift of a listening period in the UL subframe, on the basis of at least one piece of information (which may also be referred to as time shift information) relating to time shift of listening, which has been acquired from the received signal processing section 404.

Specifically, the time shift information may be information relating to timing advance (TA information). In this case, the control section 401 may control the amount of time shift of the UL subframe, recognizing that at least a part of the TA information is information relating to a temporal granularity which is larger than 16 times the sampling time ($T_s$). Note that the information relating to the temporal granularity which is larger than 16 times the sampling time may be information indicating the number of periods of a value resulted from multiplying the 16-times multiplied number of symbols or sampling time by a predetermined integer larger than 1.

In addition, the TA information may include information (amount of shift) relating to a plurality of temporal granularities, and may be configured so as to include, for example, information relating to a coarse temporal granularity and information relating to a fine temporal granularity.

In addition, the time shift information is information for shifting the listening period in the UL subframe, and may be information relating to the position (execution timing) of the CCA (CCA position information). In this case, the control section 401 may control, on the basis of the CCA position information, the amount of time shift of the listening period in a predetermined symbol (for example, the first symbol) of the UL subframe.

In addition, the time shift information may be information relating to the length of the listening period (CCA gap length information). In this case, the control section 401 may control the period during which CCA is performed, on the basis of the CCA gap length information.

The control section 401 may determine the CCA timing, on the basis of both the TA information and the CCA position information.

The transmission signal section 402 generates an uplink signal (an uplink control signal, an uplink data signal, an uplink reference signal and the like), on the basis of an instruction from the control section 401, and outputs the generated signal to the mapping section 403. The transmission signal section 402 may include a signal generator, a signal generating circuit, or a signal generating apparatus, which are described on the basis of a common recognition in the technical field of the present invention.

The transmission signal generating section 402 generates a receipt confirmation signal (HARQ-ACK) or an uplink control signal relating to the channel status information (CSI), on the basis of, for example, an instruction from the control section 401. In addition, the transmission signal generating section 402 generates an uplink data signal, on the basis of an instruction from the control section 401. For example, he transmission signal generating section 402 is instructed by the control section 401 to generate an uplink data signal in a case where a UL grant is included in a downlink control signal notified from the radio base station 10.

The mapping section 403 performs mapping of the uplink signal generated in the transmission signal generating section 402 onto a radio resource, on the basis of an instruction from the control section 401, and outputs the mapped signal to the transmission/reception section 203. The mapping section 403 may include a mapper, a mapping circuit, or a mapping apparatus, which are described on the basis of a common recognition in the technical field of the present invention.

The received signal processing section 404 performs reception processing (for example, demapping, demodulation, decoding, etc.) on the received signal which has been input from the transmission/reception sections 203. Here, the received signal is, for example a downlink signal (a downlink control signal, a downlink data signal, a downlink reference signal and the like) transmitted from the radio base station 10. The received signal processing section 404 may include a signal processor, a signal processing circuit, or a signal processing apparatus, which are described on the basis of a common recognition in the technical field of the present invention. In addition, the received signal processing section 404 may form a reception section of the present invention.

The received signal processing section 404 outputs the information decoded by reception processing to the control section 401. The received signal processing section 404 outputs, for example, broadcast information, system information, RRC signaling, DCI and the like to the control section 401. In addition, the received signal processing section 404 outputs received signals or signals subjected to reception processing to the measuring section 405.

The measuring section 405 performs the measurement relating to received signals. The measuring section 405 may include a measuring instrument, a measurement circuit, or a measuring apparatus, which are described on the basis of a common recognition in the technical field of the present invention.

The measuring section 405 may perform LBT on a carrier with setting of LBT, on the basis of an instruction from the control section 401. The measuring section 405 may output the LBT result (for example, result of determination of whether a channel state is free or busy) to the control section 401.

In addition, the measuring section 405 may measure, for example, received power of a received signal, (for example, RSRP), received signal strength (RSSI), reception quality (for example, RSRQ), channel state and the like. The result of measurement may be output to the control section 401.

(Hardware Configuration)

Note that the block diagrams used for explanation of the above-mentioned embodiments are showing blocks in terms of functions. The function blocks (component sections) are realized by any combination of hardware and/or software. In addition, realization means of each function block is not limited in particular. In other words, each function block may be realized by a physically and/or logically integrated apparatus, or may be realized by directly and/or indirectly connected (for example, in a wired and/or wireless manner) two or more physically and/or logically separated apparatuses.

Figure 13:
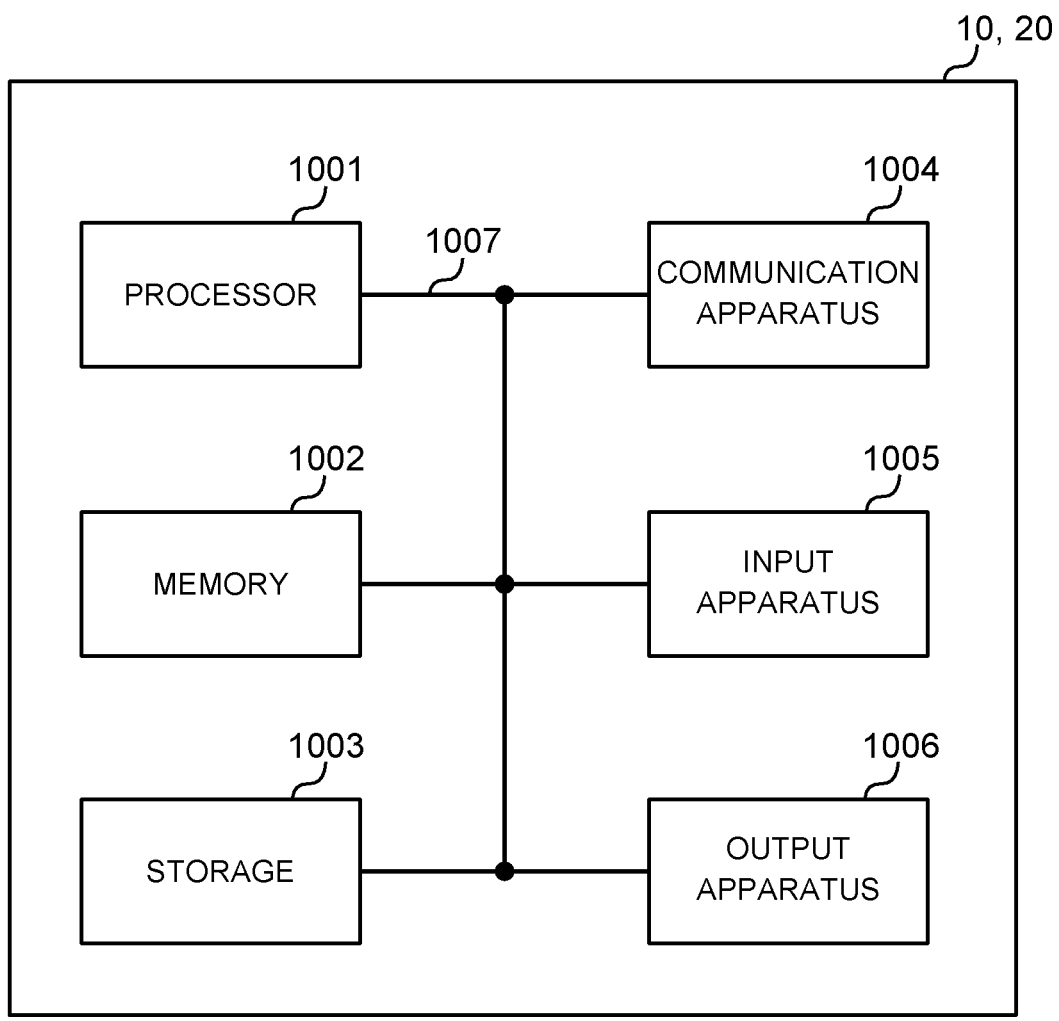
FIG. 13 shows an example of a hardware configuration of a radio base station and a user terminal according to an embodiment of the present invention.

For example, the radio base station and the user terminal in an embodiment of the present invention may function as a computer that performs processing of the radio communication method of the present invention. FIG. 13 shows an example of a hardware configuration of a radio base station and a user terminal according to an embodiment of the present invention. The radio base station 10 and the user terminal 20 described above may be physically formed as a computer apparatus including a processor 1001, a memory 1002, a storage 1003, a communication apparatus 1004, an input apparatus 1005, an output apparatus 1006, a bus 1007, and the like.

Note that, in the following description, the term "apparatus" may be replaced by "circuit", "device", "unit", and the like. The hardware configuration of the radio base station 10 and the user terminal 20 may be formed so as to include one or more members of respective apparatuses shown in the drawing, or may be configured without including some of the apparatuses.

For example, although the processor 1001 is shown as a single member, there may be a plurality of processors. In addition, processing may be performed by a single processor, or may be performed by one or more processors simultaneously, sequentially, or in other manners. Note that the processor 1001 may be implemented by one or more chips.

Each function in the radio base station 10 and the user terminal 20 is realized by reading predetermined software (program) into hardware such as the processor 1001 and the memory 1002, for example, and performing operation by the processor 1001 so as to control communication performed by the communication apparatus 1004 and reading and/or writing of data from and to the memory 1002 and the storage 1003.

The processor 1001 controls the entire computer by running an operating system, for example. The processor 1001 may include a Central Processing Unit (CPU) including interfaces with peripheral apparatuses, a control apparatus, an arithmetic operation apparatus, a register and the like. For example, the above-mentioned baseband signal processing section 104 (204), the call processing section 105 and the like may be realized by the processor 1001.

In addition, the processor 1001 reads programs (program codes), software modules, data and the like into the memory 1002 from the storage 1003 and/or the communication apparatus 1004, and performs various processing in accordance therewith. As such programs, programs that cause a computer to perform at least a part of the operation described in the above-mentioned embodiments are used. For example, the control section 401 of the user terminal 20 may be realized by a control program stored in the memory 1002 and executed by the processor 1001, and other function blocks may be realized in a similar manner.

The memory 1002 is a computer-readable storage medium and may include at least one of, for example, a ROM (Read Only Memory), an EPROM (Erasable Programmable ROM), an EEPROM (Electrically EPROM), a RAM (Random Access Memory), or any other appropriate storage medium. The memory 1002 may also be referred to as a register, a cash, a main memory (main storage apparatus), and the like. The memory 1002 is capable of storing programs (program codes), software modules and the like, which may be executed to perform the radio communication method according to an embodiment of the present invention.

The storage 1003 is a computer-readable storage medium, and may include at least one of, for example, a flexible disc, a floppy (registered trademark) disc, a magneto-optical disc (for example, a compact disc (CD-ROM (Compact Disc ROM), etc.), a Digital Versatile Disc, a Blu-ray (registered trademark) disc, a removable disc, a hard disc drive, a smart card, a flash memory device (for example, a card, a stick, a key drive), a magnetic stripe, a database, a server, or any other appropriate storage medium. The storage 1003 may also be referred to as an auxiliary storage apparatus.

The communications apparatus 1004 is hardware (transmission/reception device) for performing communication between computers via a wired and/or wireless network, and is also referred to as, for example, a network device, a network controller, a network card, a data communication module, and the like. For example, the transmission/reception antennas 101 (201), the amplifying sections 102 (202), the transmission/reception sections 103 (203), the communication path interface 106 and the like may be realized by the communication apparatus 1004.

The input apparatus 1005 is an input device (for example, a keyboard, a mouse, a microphone, a switch, a button, a sensor, etc.) for accepting input from the outside. The output apparatus 1006 is an output device performing the output to the outside (for example, a display, a loud speaker, an LED (Light Emitting Diode) lamp, etc.). Note that the input apparatus 1005 and the output apparatus 1006 may be formed in an integrated manner (for example, a touch panel).

In addition, respective apparatuses such as the processor 1001 and the memory 1002 are connected via the bus 1007 for communicating information. The bus 1007 may include a single bus, or may include different buses depending on the apparatuses.

In addition, the radio base station 10 and the user terminal 20 may be configured so as to include hardware such as a microprocessor, a Digital Signal Processor (DSP), an ASIC (Application Specific Integrated Circuit), a PLD (Programmable Logic Device) and FPGA (Field Programmable Gate Array), and a part or all of each function block may be realized by the hardware. For example, the processor 1001 may be implemented by at least one of such hardware.

(Modification)

Note that the terms explained in the present specification and/or the terms required for understanding the present specification may be replaced by terms having identical or similar meanings. For example, "channel" and/or "symbol" may be "signal (signaling)". In addition, "signal" may be "message". "Reference signal" may also be abbreviated as RS (Reference Signal), or may also be referred to as Pilot, a pilot signal, according to the applied standard. In addition, "Component Carrier (CC)" may also be referred to as "cell", "frequency carrier", "carrier frequency", and the like.

In addition, a radio frame may include one or more periods (frames) in the time domain. Each of the one or more periods (frames) included in a radio frame may also be referred to as a subframe. Furthermore, a subframe may include one or more slots in the time domain. Furthermore, a slot may include one or more symbols (OFDM (Orthogonal Frequency Division Multiplexing) symbols, SC-FDMA (Single Carrier Frequency Division Multiple Access) symbols and the like) in the time domain.

A radio frame, a subframe, slot, and a symbol all express a time unit when transmitting a signal. Each of the radio frame, subframe, slot, and symbol may be referred using another corresponding nomenclature. For example, a single subframe may also be referred to as a Transmission Time Interval (TTI), a plurality of successive subframes may also be referred to as a TTI, or a single slot may also be referred to as a TTI. In other words, a subframe and TTI may be a subframe in an existing LTE (1 ms), may be a shorter period than 1 ms (for example, 1 to 13 symbols), or may be a longer period than 1 ms.

Here, TTI indicates, for example, the minimum time unit of scheduling in radio communication. For example, in an LTE system, the radio base station performs scheduling for each user terminal so as to allocate radio resources (frequency band width, transmission power and the like, which are available in each user terminal) in units of TTI. Note that the definition of TTI is not limited thereto. A TTI may be a transmission time unit of a channel-coded data packet (transport block), or may turn out to be a unit of processing scheduling, link adaptation, and the like.

A TTI having a time length of 1 ms may also be referred to as an ordinary TTI (TTI in LTE Rel. 8-12), a normal TTI, a long TTI, an ordinary subframe, a normal subframe, or a long subframe. A TTI shorter than an ordinary TTI may be also referred to as a contracted TTI, a short TTI, a contracted subframe, or a short subframe.

A Resource Block (RB) is a resource allocation unit in the time domain and the frequency domain, and may include one or more successive subcarriers in the frequency domain. In addition, an RB may include one or more symbols in the time domain, and may have a length of a single slot, subframe, or TTI. A single TTI and a single subframe may respectively include one or more resource blocks. Note that an RB may also be referred to as a physical resource block (PRB: Physical RB), a PRB pair, an RB pair, and the like.

In addition, a resource block may include one or more Resource Elements (RE). For example, a single RE may be a radio resource domain of a single subcarrier and a single symbol.

Note that the structure of the radio frame, subframe, slot, and symbol is merely exemplary. For example, the number of subframes included in a radio frame, the number of slots included in a subframe, the number of symbols and RBs included in a slot, the number of subcarriers included in an RB, and the number of symbols in a TTI, the symbol length, the Cyclic Prefix (CP) length and the like may be changed in various ways.

In addition, the information, parameters and the like described in the present specification may be expressed as absolute values, may be expressed as values relative to predetermined values, or may be expressed by another corresponding information. For example, radio resources may be those indicated by predetermined indices. Furthermore, the mathematical formulas using the above-mentioned parameters may be different from those explicitly disclosed in the present specification.

The names used for the parameters in the present specification are by no means limiting. For example, various channels (PUCCH (Physical Uplink Control Channel), PDCCH (Physical Downlink Control Channel), etc.) and information elements may be identified using any preferred names, and therefore various names assigned to such various channels and information elements are by no means limiting.

Information, signals and the like described in the present specification may be expressed using any of a variety of different techniques. For example, data, instructions, commands, information, signals, bits, symbols, chips and the like, which may be mentioned all over the foregoing description may be expressed in terms of voltage, electric current, electromagnetic waves, magnetic fields, magnetic particles, optical fields, photons, or any combinations thereof.

In addition, information, signals and the like may be output from upper layers to lower layers, and/or from lower layers to upper layers. Information, signals and the like may be input and output via a plurality of network nodes.

The information, signals and the like which have been input and output may be stored in a particular site (for example, a memory), or may be managed in a management table. The information, signal and the like to be input and output may be subject to overwriting, updating or addition. The information, signals and the like which have been output may be deleted. The information, signals and the like which have been input may be transmitted to other apparatuses.

Notification of information is not limited to the aspects/embodiments described in the present specification, and may be implemented by other methods. For example, notification of information may be performed by physical layer signaling (for example, Downlink Control Information (DCI), Uplink Control Information (UCI), upper layer signaling (for example, RRC (Radio Resource Control) signaling, broadcast information (MIB (Master Information Block), SIB (System Information Block), etc.), MAC (Medium Access Control) signaling), and any other types of signals, or combinations thereof.

Note that physical layer signaling may also be referred to as L1/L2 (Layer 1/Layer 2) control information (L1/L1 control signal), L1 control information (L1 control signal), and the like. In addition, RRC signaling may also be referred to as an RRC message and may be, for example, an RRC Connection Setup message, an RRC Connection Re-configuration message, and the like. In addition, MAC signaling may be notified by a MAC Control Element (MAC CE (Control Element)), for example.

In addition, notification of predetermined information (for example, a notification of "being X") is not limited to being explicitly performed, and may be performed implicitly (for example, by not notifying the predetermined information, or by notifying different information).

Determination may be performed by a value expressed by one bit (0 or 1), or may be performed by a truth value (boolean) expressed as true or false, or may be performed by numerical comparison (for example, comparison with a predetermined value).

Software, regardless of whether it is referred to as software, firmware, middleware, microcode, hardware description language, or being referred to by other names, should be interpreted to cover a wide range of meaning such as an instruction, instruction set, code, code segment, program code, program, subprogram, software module, application, software application, software package, routine, subroutine, object, executable file, execution thread, procedure and function.

In addition, software, instruction, information and the like may be transmitted and received via a transmission medium. For example, in a case where software is transmitted from a website, server, or other remote sources using a wired technique (coaxial cable, optical fiber cable, twisted pair, Digital Subscriber Line (DSL), etc.) and/or a wireless technique (infrared, microwave, etc.), such a wired technique and/or wireless technique is included within the definition of the transmission medium.

The terms "system" and "network" used in the present specification are interchangeably used.

In the present specification, the terms "Base Station (BS)", "radio base station", "eNB", "cell", "sector", "cell group", "carrier", and "component carrier" may be interchangeably used. A base station may also be referred to by terms such as fixed station, NodeB, eNodeB (eNB), access point, transmission point, reception point, femto-cell, small cell, and the like.

A base station is capable of accommodating one or more (for example, three) cells (which may also be referred to as sectors). When a base station accommodates a plurality of cells, the entire coverage area of the base station may be divided into a plurality of smaller areas, each smaller area being capable of providing communication service by a base station subsystem (for example, an indoor compact base station (RRH: Remote Radio Head). The terms "cell" or "sector" indicate a part or all of the coverage area of a base station and/or a base station subsystem providing communication service within the coverage.

In the present specification, the terms "Mobile Station (MS)", "user terminal", "User Equipment (UE)", and "terminal" may be interchangeably used. A base station may also be referred to by terms such as fixed station, NodeB, eNodeB (eNB), access point, transmission point, reception point, femto-cell, small cell, and the like.

A mobile station may also be referred to, by those skilled in the art, as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other appropriate terms.

In addition, the radio base station in present specification may be replaced by user terminals. For example, respective aspects/embodiments of the present invention may be applied to a configuration in which communication between the radio base station and user terminals is replaced by communication between a plurality of user terminals (D2D: Device-to-Device). In this case, there may also be a configuration in which the user terminal 20 has the function included in the radio base station 10. In addition, words such as "uplink" and "downlink" may be replaced by "side". For example, an uplink channel may be replaced by a side channel.

Similarly, user terminals in the present specification may be replaced by a radio base station. In this case, there may also be a configuration in which the radio base station 10 has the function included in the user terminal 20.

In the present specification, particular operations supposed to be performed by the base station may be performed by an upper node in accordance with the situation. In a network including one or more network nodes having a base station, it is apparent that various operations performed for communication with terminals may be performed by a base station, one or more network nodes (which may be, but not limited to, for example, MME (Mobility Management Entity), S-GW (Serving-Gateway), etc.) other than the base station, or combinations thereof.

Respective aspects/embodiments described in the present specification may be used alone, may be used in combination, or may be used in a switching manner during execution. In addition, the order in the processing procedures, sequences, flowcharts and the like of respective aspects/embodiments described in the present specification may be interchanged provided that there is no contradiction. For example, the method described in the present specification, while presenting elements of various steps in an exemplary order, is not limited to the presented particular order.

Respective aspects/embodiments described in the present specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), GSM (registered trademark) (Global System for Mobile communications), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and any other systems using appropriate radio communication methods and/or a next-generation system enhanced on the basis thereof.

The phrase "on the basis of" used in the present specification does not mean "on the basis of only" unless otherwise explicitly stated. In other words, the phrase "on the basis of" has the meaning of both "on the basis of only" and "on the basis of at least".

Any reference to elements using ordinals such as "first" "second" used in the present specification does by no means limit the amount or order of the elements in general. The ordinals may be used in the present specification as a method for conveniently distinguishing between two or more elements. Therefore, reference to a first and a second elements does not mean that only two elements are employed, or that the first element must precede the second element in any way.

The phrase "determining" used in the present specification may cover a variety of operations. For example, "determining" may be regarded as "determining" execution of "calculating", "computing", "processing", "deriving", "investigating", "looking up" (for example, looking up in a table, a database, or another data structure), "ascertaining", and the like. In addition, "determining" may be regarded as "determining" execution of "receiving" (for example, receiving information), "transmitting" (for example, transmitting information), "inputting", "outputting", "accessing" (for example, accessing data in the memory), and the like. In addition, "determining" may be regarded as "determining" execution of "resolving", "selecting", "choosing", "establishing", "comparing", and the like. In other words, "determining" may be regarded as "determining" a certain operation.

The phrases "connected", "coupled", or any flexion thereof used in the present specification means any direct or indirect connection or coupling between two or more elements, and may include existence of one or more intermediate elements between two elements which are "connected" or "coupled" to each other. Coupling or connection between elements may be physical, logical, or a combination thereof. When used in the present specification, two elements may be considered to be "connected" or "coupled" to each other by using one or more electric wires, cables and/or printed electric connection, or by using, as some non-limiting and non-comprehensive examples, electromagnetic energy such as electromagnetic energy having a wavelength in the radio-frequency domain, the microwave domain, and the optical (both visible and invisible) domain.

When the phrases "including", "comprising", or any flexion thereof are used in the present specification or claims, they are intended to be comprehensive, similarly to the phrase "being provided with". Furthermore, the phrase "or" used in the present specification or claims is not intended indicate an exclusive logical sum.

As described above, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the claims. Accordingly, the descriptions of the Description are intended for illustrative explanation, and do not have any restrictive meaning to the invention.

The present application is based on Japanese Patent Application No. 2016-081386 filed on Apr. 14, 2016, entire content of which is expressly incorporated by reference herein.

The invention claimed is:

1. A terminal comprising:
a transmitter that transmits a signal on a carrier where listening is performed prior to uplink transmission;

a receiver that receives downlink control information (DCI) for scheduling the uplink transmission on the carrier; and a processor that controls execution timing of the listening on the basis of at least one piece of timing information included in the DCI, the at least one piece of timing information being based on both a length of a period of the listening as executed and a timing advance value, wherein the processor controls the execution timing of the listening within one symbol on the basis of the timing information relating to the length of the period of the listening as executed and the timing advance value, wherein the length of the period of the listening is associated with a clear channel assessment gap length information, and wherein the timing advance value is associated with a temporal granularity.

2. The terminal according to claim 1, wherein the processor controls the length of the period of the listening on the basis of information relating to the length of the period of the listening.

3. The terminal according to claim 2, wherein the length of the period of the listening is 25 µs.

4. The terminal according to claim 1, wherein the length of the period of the listening is 25 µs.

5. A radio communication method for a terminal, comprising:

transmitting a signal on a carrier where listening is performed prior to uplink transmission;

receiving downlink control information (DCI) for scheduling the uplink transmission on the carrier;

controlling execution timing of the listening on the basis of at least one piece of timing information included in the DCI, the at least one piece of timing information being based on both a length of a period of the listening as executed and a timing advance value; and controlling the execution timing of the listening within one symbol on the basis of the timing information relating to the length of the period of the listening as executed and the timing advance value, wherein the length of the period of the listening is associated with a clear channel assessment gap length information, and wherein the timing advance value is associated with a temporal granularity.

6. A base station comprising:

a receiver that receives a signal on a carrier where listening is performed prior to uplink transmission; and a transmitter that transmits, to a terminal, downlink control information (DCI) for scheduling the uplink transmission on the carrier, wherein execution timing of the listening is controlled, at the terminal, on the basis of at least one piece of timing information included in the DCI, the at least one piece of timing information being based on both a length of a period of the listening as executed and a timing advance value, wherein the execution timing of the listening is controlled within one symbol on the basis of the timing information relating to the length of the period of the listening as executed and the timing advance value, wherein the length of the period of the listening is associated with a clear channel assessment gap length information, and wherein the timing advance value is associated with a temporal granularity.

7. A system comprising a terminal and a base station, wherein:

the terminal comprises:

a transmitter that transmits a signal on a carrier where listening is performed prior to uplink transmission;

a receiver that receives downlink control information (DCI) for scheduling the uplink transmission on the carrier; and a processor that controls execution timing of the listening on the basis of at least one piece of timing information included in the DCI, the at least one piece of timing information being based on both a length of a period of the listening as executed and a timing advance value; and the base station comprises:

a receiver that receives the signal on the carrier where listening is performed prior to uplink transmission; and a transmitter that transmits, to the terminal, the DCI for scheduling the uplink transmission on the carrier, wherein the processor, of the terminal, controls the execution timing of the listening within one symbol on the basis of the timing information relating to the length of the period of the listening as executed and the timing advance value, wherein the length of the period of the listening is associated with a clear channel assessment gap length information, and wherein the timing advance value is associated with a temporal granularity.

* * * * *